US011865688B2

(12) United States Patent
Machida et al.

(10) Patent No.: US 11,865,688 B2
(45) Date of Patent: Jan. 9, 2024

(54) IMPACT TOOL

(71) Applicant: MAKITA CORPORATION, Anjo (JP)

(72) Inventors: Yoshitaka Machida, Anjo (JP); Kiyonobu Yoshikane, Anjo (JP)

(73) Assignee: MAKITA CORPORATION, Anjo (JP)

(*) Notice: Subject to any disclaimer, the term of this patent is extended or adjusted under 35 U.S.C. 154(b) by 129 days.

(21) Appl. No.: 17/567,970

(22) Filed: Jan. 4, 2022

(65) Prior Publication Data

US 2022/0258319 A1 Aug. 18, 2022

(30) Foreign Application Priority Data

Feb. 15, 2021 (JP) ................................ 2021-021973
Feb. 15, 2021 (JP) ................................ 2021-021974

(51) Int. Cl.

| | |
|---|---|
| ***B25D 16/00*** | (2006.01) |
| *B25D 9/00* | (2006.01) |
| *B25D 17/20* | (2006.01) |

(52) U.S. Cl.

CPC ......... *B25D 16/006* (2013.01); *B25D 16/003* (2013.01); *B25D 9/00* (2013.01); *B25D 17/20* (2013.01); *B25D 2216/0084* (2013.01); *B25D 2250/181* (2013.01); *B25D 2250/331* (2013.01); *B25D 2250/365* (2013.01)

(58) Field of Classification Search

CPC ........ B25D 9/00; B25D 16/006; B25D 17/20; B25D 2216/0084; B25D 2250/181; B25D 2250/331; B25D 2250/365

See application file for complete search history.

(56) References Cited

U.S. PATENT DOCUMENTS

| | | | | |
|---|---|---|---|---|
| 6,666,284 B2 * | 12/2003 | Stirm | B25D 16/00 | 173/104 |
| 6,739,406 B2 * | 5/2004 | Lebisch | B25D 17/26 | 173/171 |
| 7,410,009 B2 * | 8/2008 | Hirayama | B25F 5/00 | 173/201 |
| 7,503,402 B2 * | 3/2009 | Ookubo | B25F 5/001 | 173/205 |

(Continued)

FOREIGN PATENT DOCUMENTS

JP 4461062 B2 5/2010

*Primary Examiner* — Thomas M Wittenschlaeger
*Assistant Examiner* — David G Shutty
(74) *Attorney, Agent, or Firm* — Oliff PLC

(57) ABSTRACT

An impact tool includes a housing; and a motor, a tubular tool holder, a driving mechanism, a rotation shaft, a driving mechanism housing region inside the housing. The tool holder has a distal end on which a bit is mountable. The driving mechanism is configured to hammer the bit. The rotation shaft is disposed in the driving mechanism and rotates by a rotation of an output shaft of the motor. The driving mechanism housing region houses the driving mechanism in a sealed state inside the housing. The air escape path that releases air inside the driving mechanism housing region to outside of the driving mechanism housing region is formed inside the rotation shaft while an inlet of the air escape path is formed on an outer peripheral surface of the rotation shaft.

14 Claims, 16 Drawing Sheets

(56) References Cited

U.S. PATENT DOCUMENTS

| | | | | |
|---|---|---|---|---|
| 8,360,168 | B2 * | 1/2013 | Kakiuchi | F16H 57/027 173/104 |
| 8,522,890 | B2 * | 9/2013 | Abe | B25D 17/26 173/48 |
| 8,672,050 | B2 * | 3/2014 | Baumann | B25D 17/26 173/216 |
| 9,227,312 | B2 * | 1/2016 | Wang | B25D 16/006 |
| 9,533,406 | B2 * | 1/2017 | Aoki | B25D 11/125 |
| 2003/0121683 | A1 * | 7/2003 | Lebisch | B25D 17/26 173/217 |
| 2022/0258319 | A1 * | 8/2022 | Machida | B25D 16/003 |

* cited by examiner

IMPACT TOOL

BACKGROUND OF THE INVENTION

This application claims the benefit of Japanese Patent Application Numbers 2021-021973 and 2021-021974 filed on Feb. 15, 2021, the entire contents of which are incorporated herein by reference in its entirety.

FIELD OF THE INVENTION

The disclosure relates to an impact tool, such as a hammer drill.

DESCRIPTION OF RELATED ART

An impact tool such as a hammer drill holds, inside a housing, a tool holder in which a bit can be mounted on a distal end. Inside the housing, an inner housing that supports the tool holder and an output shaft of a motor is disposed and houses a driving mechanism that hammers the bit in a sealed state. As disclosed in Japanese Patent No. 4461062, there has been known a driving mechanism that includes a piston (including a piston cylinder) that reciprocates back and forth, a striker that moves in conjunction with the reciprocation of the piston via an air chamber, and a power conversion mechanism that converts the rotation of the output shaft to the reciprocation of the piston.

In the impact tool, when the driving mechanism generates heat by a hammering actuation, the pressure inside a driving mechanism housing region increases. Consequently, there is a risk that the pressure balance between the inside of the driving mechanism housing region and the inside of the air chamber is lost, resulting in an occurrence of hammering failure in which the striker does not normally operate in a straight line. In order to reduce the occurrence of the hammering failure, in Japanese Patent No. 4461062, a pressure adjustment passage is employed. The pressure adjustment passage is formed by inserting a tubular member into a closed-end hole disposed on the rear end of a rotation shaft. An inlet of the pressure adjustment passage is formed inside the inner housing and between the rear end of the rotation shaft and the tubular member. An outlet of the pressure adjustment passage is formed on the distal end of the tubular member and projects to the outside of the inner housing. Accordingly, when the air inside the inner housing expands and the internal pressure increases, the air inside the inner housing is discharged to the outside of the inner housing via the pressure adjustment passage to release the pressure.

In the impact tool of Japanese Patent No. 4461062, the inlet of the pressure adjustment passage is formed in a small space between a bearing and stop ring that support the rotation shaft and the inner surface of the inner housing. Accordingly, there has been a risk that, if grease enters the space, the pressure adjustment passage is clogged, not allowing the air to be released outside.

Therefore, it is an object of the disclosure to provide an impact tool with which pressure increased inside a driving mechanism housing region due to heat generation of a driving mechanism can be effectively released.

SUMMARY OF THE INVENTION

In order to achieve the above-described object, there is provided an impact tool according to the disclosure. The impact tool includes a housing inside which a motor, a tubular tool holder, a driving mechanism, a rotation shaft, and a driving mechanism housing region are disposed. The tubular tool holder has a distal end on which a bit is mountable. The driving mechanism is configured to hammer the bit. The rotation shaft is disposed in the driving mechanism and rotates by a rotation of an output shaft of the motor. The driving mechanism housing region houses the driving mechanism in a sealed state inside the housing. An air escape path that releases air inside the driving mechanism housing region to outside of the driving mechanism housing region is formed inside the rotation shaft while an inlet of the air escape path is formed on an outer peripheral surface of the rotation shaft.

With the disclosure, since the inlet of the air escape path is formed on the outer peripheral surface of the rotation shaft, the centrifugal force makes it difficult for the grease inside the driving mechanism housing region to enter the air escape path. Accordingly, the pressure increased inside the driving mechanism housing region due to the heat generation of the driving mechanism can be effectively released.

DETAILED DESCRIPTION

Figure 1:
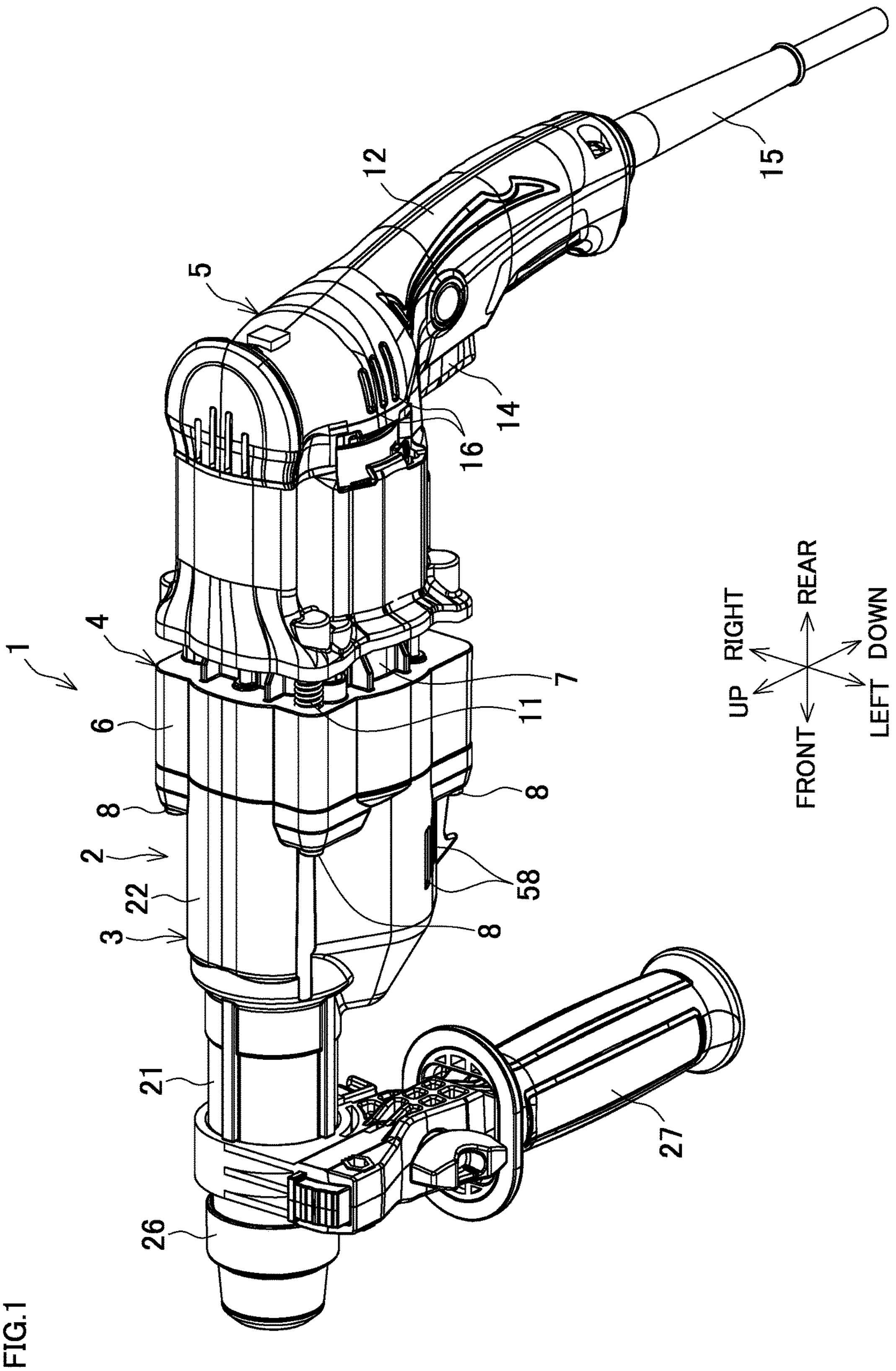
FIG. 1 is a perspective view from a rear of a hammer drill.

In one embodiment of the disclosure, the inlet of the air escape path may be formed at a through-hole that passes through the rotation shaft in an orthogonal manner. With this configuration, air can enter the air escape path from both ends of the through-hole, and even when one end is clogged by the grease, the entry of the air from the other end can be ensured.

In one embodiment of the disclosure, a bearing that supports the rotation shaft may be disposed inside the driving mechanism housing region, and an outlet of the air escape path may be formed on an opposite side of the driving mechanism housing region across the bearing in an axis line direction of the rotation shaft. With this configuration, the air escape path can be formed in a short distance in the axis line direction of the rotation shaft.

In one embodiment of the disclosure, the bearing may be a bearing with a seal. With this configuration, a risk that the grease flows into the air escape path from the bearing is reduced.

In one embodiment of the disclosure, the inlet of the air escape path may be arranged at an intermediate portion in the axis line direction of the rotation shaft. With this configuration, it becomes further difficult for the grease inside the driving mechanism housing region to enter the inlet.

In one embodiment of the disclosure, a spline portion to which a clutch for switching an operation mode is slidably connected may be formed in the rotation shaft, and the inlet of the air escape path may be arranged in the spline portion. With this configuration, the grease is splashed by the rotating spline teeth and the entry of the grease into the inlet is preferably avoided.

In one embodiment of the disclosure, the driving mechanism housing region may be formed inside an inner housing which is disposed inside the housing. The inner housing may include a holding depressed portion that holds the bearing. A ring-shaped peripheral wall portion projecting to the driving mechanism housing region side may be formed around the holding depressed portion. With this configuration, it becomes difficult for the grease to enter the holding depressed portion along the inner surface of the inner housing.

In one embodiment of the disclosure, a gear adjacent to the peripheral wall portion in the axis line direction may be disposed on the rotation shaft. With this configuration, the grease is splashed by the rotating gear and the entry of the grease into a gap between the gear and the peripheral wall portion is also preferably avoided.

In one embodiment of the disclosure, the driving mechanism may include a rotation actuation portion configured to rotate the tool holder, a rotation shaft configured to transmit a rotation to the tool holder, and a rotation shaft configured to hammer the bit, and the rotation shaft where the inlet is formed is the rotation shaft configured to transmit a rotation. With this configuration, the air escape path can be easily formed.

The following describes embodiments of the disclosure based on the drawings.

An outline description of the hammer drill is provided below.

Figure 2:
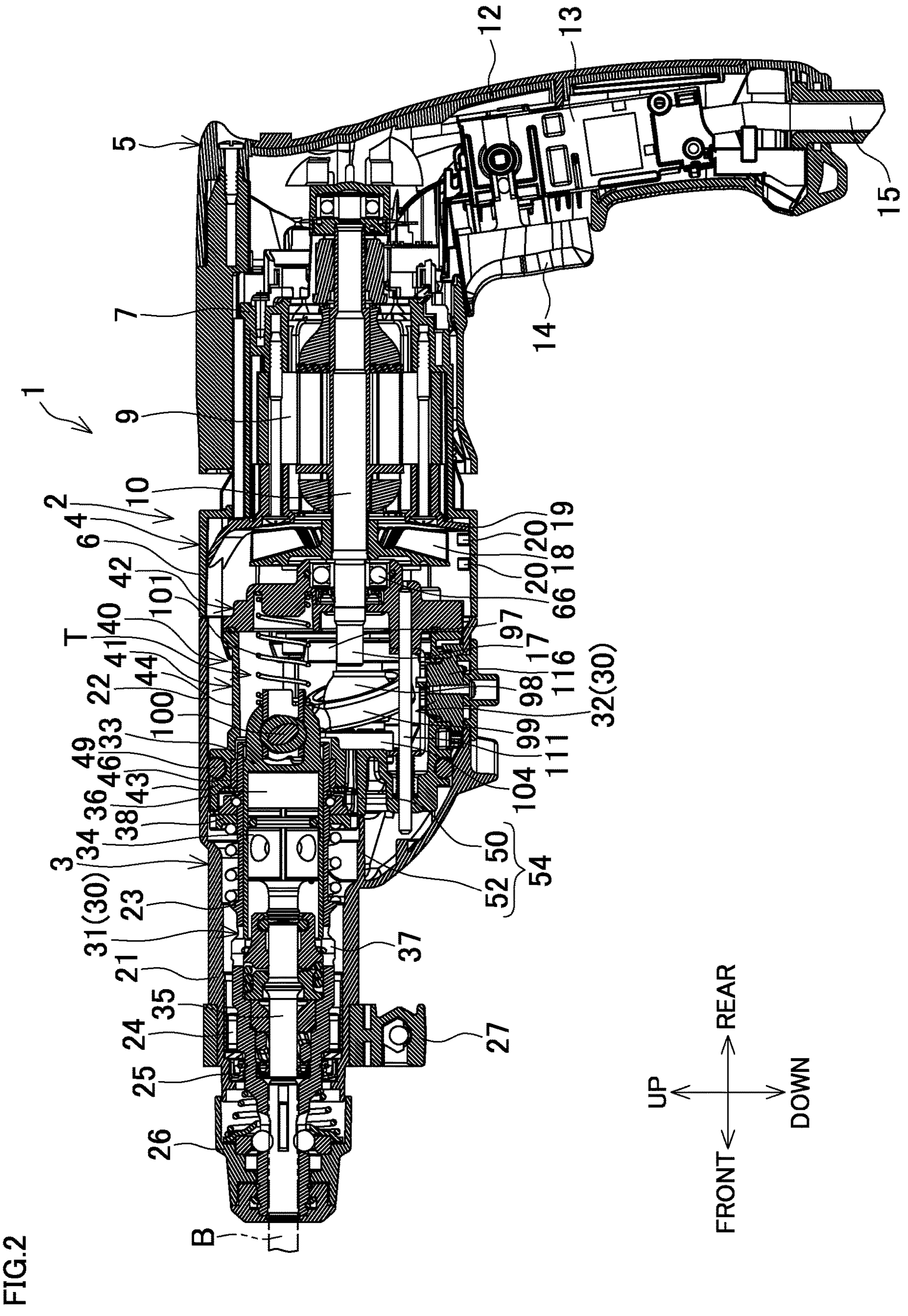
FIG. 2 is a center vertical cross-sectional view of the hammer drill.
Figure 3:
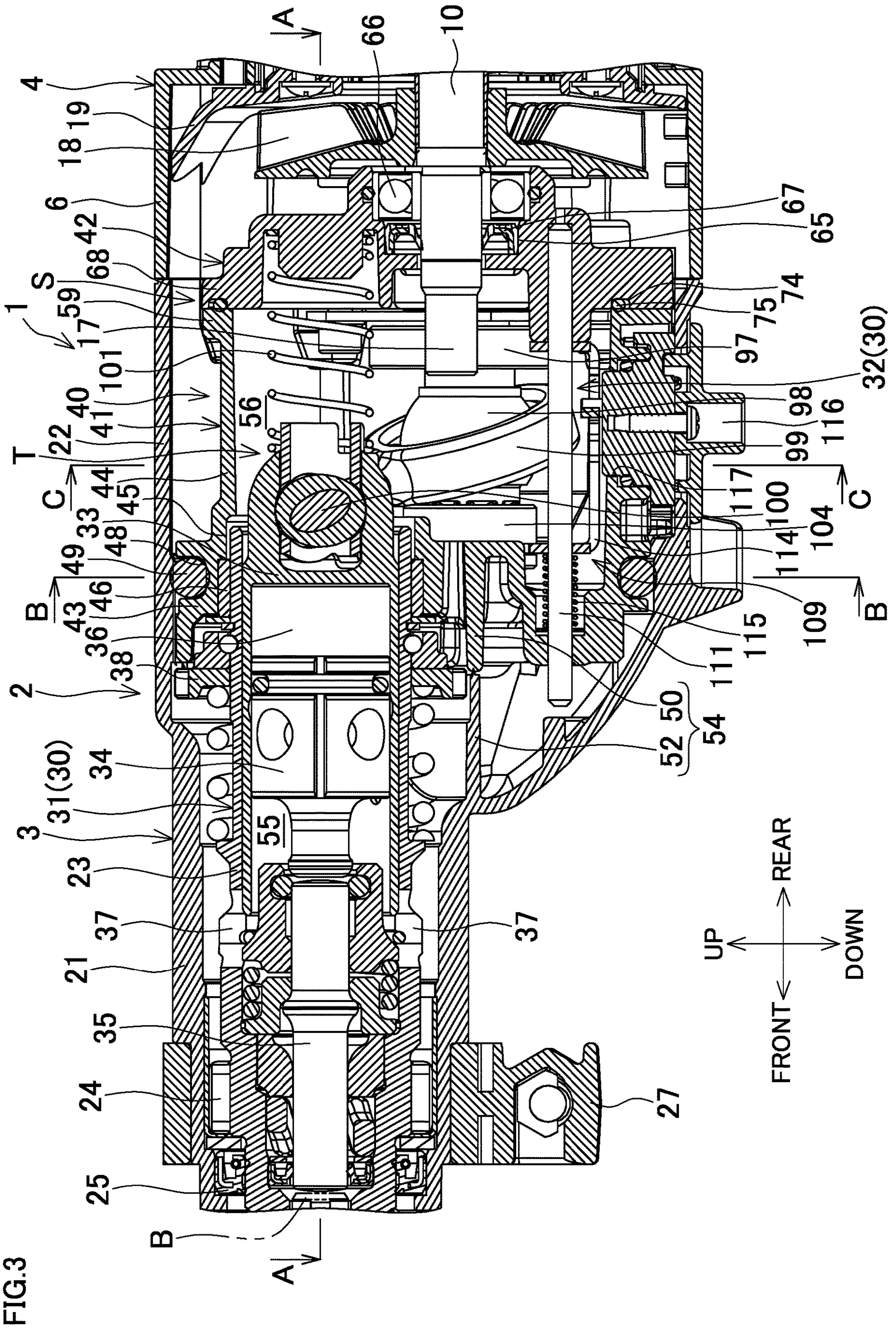
FIG. 3 is an enlarged view of a driving mechanism part in FIG. 2.
Figure 4:
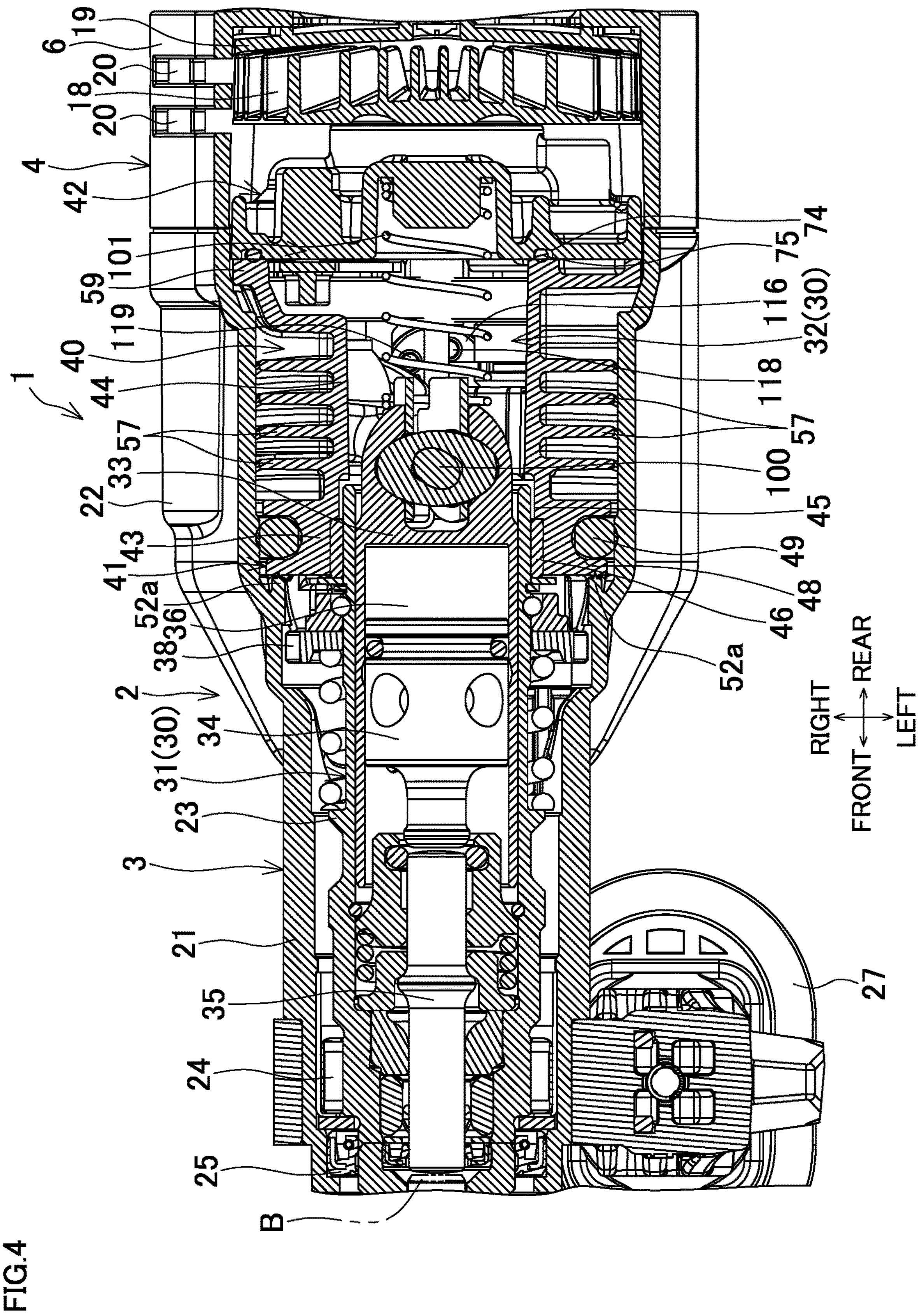
FIG. 4 is a cross-sectional view taken along line A-A in FIG. 3.

FIG. 1 is a perspective view illustrating an example of the hammer drill. FIG. 2 is a center vertical cross-sectional view of the hammer drill. FIG. 3 is an enlarged view of a driving mechanism part in FIG. 2. FIG. 4 is a cross-sectional view taken along the line A-A in FIG. 3.

A hammer drill 1 includes a housing 2 that forms an outer wall. The housing 2 includes an outer housing 3 on the front side, a motor housing 4 behind the outer housing 3, and a handle housing 5 behind the motor housing 4.

Figure 5:
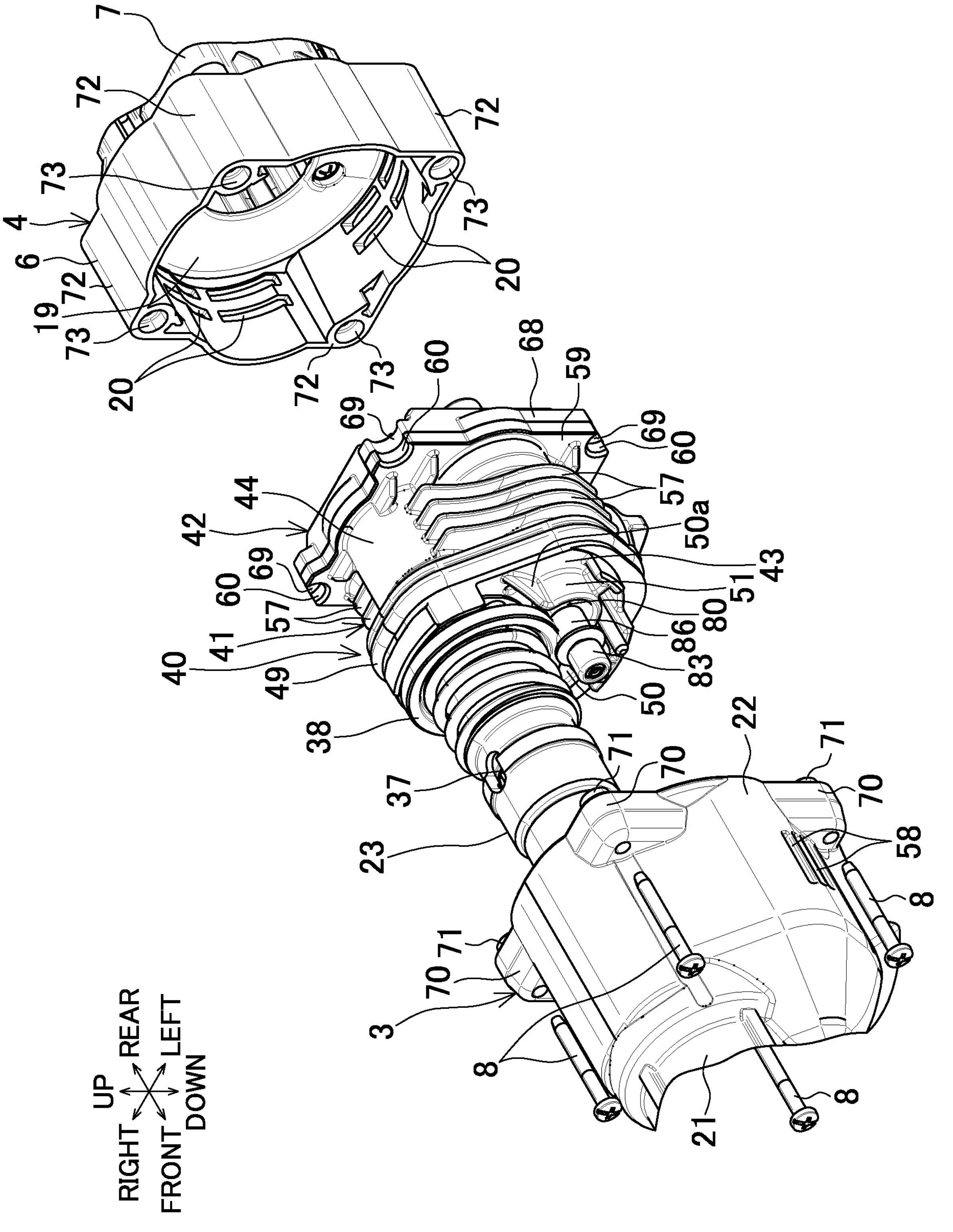
FIG. 5 is an exploded perspective view of an outer housing, a motor housing, and an inner housing.

The motor housing 4 includes a connecting portion 6 having a square shape in a front view on the front side and a tubular motor housing portion 7 on the rear side. As illustrated in FIG. 5, the connecting portion 6 is connected to the outer housing 3 from the front at the four corners in the front view by four screws 8, 8 . . . . A motor 9 is housed in the motor housing portion 7 in a posture in which an output shaft 10 is faced forward.

The handle housing 5 is externally mounted to the motor housing portion 7 from the rear and relatively movable in a front-rear direction. The handle housing 5 is biased to a retreated position via a vibration absorbing mechanism using a coil spring 11.

On the rear end of the handle housing 5, a handle 12 extending to a downward direction is formed. A switch 13 in which a trigger 14 is projected forward is housed inside the handle 12. A power supply cord 15 is connected to the switch 13. The power supply cord 15 is extracted from the lower end of the handle 12. A plurality of air inlets 16, 16 . . . extending in the front-rear direction are each formed on the right and left side surfaces of the handle 12. The right and left air inlets 16 are arranged so as to be opposed sandwiching an axis line of the output shaft 10.

The output shaft 10 of the motor 9 passes through the connecting portion 6 and projects into the outer housing 3. A pinion 17 is formed on the front end of the output shaft 10. A fan 18 is secured to the output shaft 10 inside the connecting portion 6. A baffle plate 19 is secured behind the fan 18 and inside the connecting portion 6. A plurality of rear exhaust outlets 20, 20 . . . are each formed outside in the radial direction of the fan 18 and on the lower surface and the right side surface of the connecting portion 6.

The outer housing 3 includes a front cylinder portion 21 and a rear cylinder portion 22. The front cylinder portion 21 has a tubular shape extending forward and a circular shape in the cross section. The rear cylinder portion 22 has a larger diameter than that of the front cylinder portion 21 and has a tubular shape with a hexagonal shape in a front view. The front cylinder portion 21 is arranged at an eccentric position on the upper side of the rear cylinder portion 22.

Inside the front cylinder portion 21, a tubular tool holder 23 is coaxially housed. The tool holder 23 has a front end projecting forward from the front cylinder portion 21. A bearing 24 supporting the front portion of the tool holder 23 is held onto the front end of the front cylinder portion 21. An oil seal 25 sealing between the front cylinder portion 21 and the tool holder 23 is disposed ahead of the bearing 24.

On the front end of the tool holder 23 projecting from the front cylinder portion 21, an operation sleeve 26 is disposed. The operation sleeve 26 is disposed for performing attachment and removal operations of a bit B at the distal end of the tool holder 23. A side grip 27 is mounted to the front end of the front cylinder portion 21.

Inside the outer housing 3, a driving mechanism 30 is disposed. The driving mechanism 30 includes a rotation/hammering actuation portion 31 and a rotation/hammering switching portion 32 behind the rotation/hammering actuation portion 31.

The rotation/hammering actuation portion 31 includes the tool holder 23, a piston cylinder 33, a striker 34, and an impact bolt 35. The piston cylinder 33 has a front end opened and is housed to be movable back and forth at the rear portion of the tool holder 23. The striker 34 is housed to be movable back and forth into the piston cylinder 33 via an air chamber 36. The impact bolt 35 is housed to be movable back and forth ahead of the striker 34 and into the tool holder 23. The tool holder 23 is communicated with the inside of the front cylinder portion 21 by a plurality of through holes 37, 37. The tool holder 23 includes a rear portion projecting into the rear cylinder portion 22. A gear 38 with a torque limiter is disposed on the outer periphery of the tool holder 23 inside the rear cylinder portion 22.

Inside the connecting portion 6 and the rear cylinder portion 22, an inner housing 40 is housed. The inner housing 40 supports the rear portion of the tool holder 23 on the rear side of the gear 38. The rotation/hammering switching portion 32 is housed inside the inner housing 40. The rotation/hammering switching portion 32 switches an operation mode by operating a switching knob 116 disposed on the lower surface of the rear cylinder portion 22 and transmits the rotation of the output shaft 10 to the rotation/hammering actuation portion 31.

A description of the inner housing is provided below.

The inner housing 40 is divided into front and rear parts and includes a front housing 41 made of metal and a rear housing 42 made of a resin.

Figure 6:
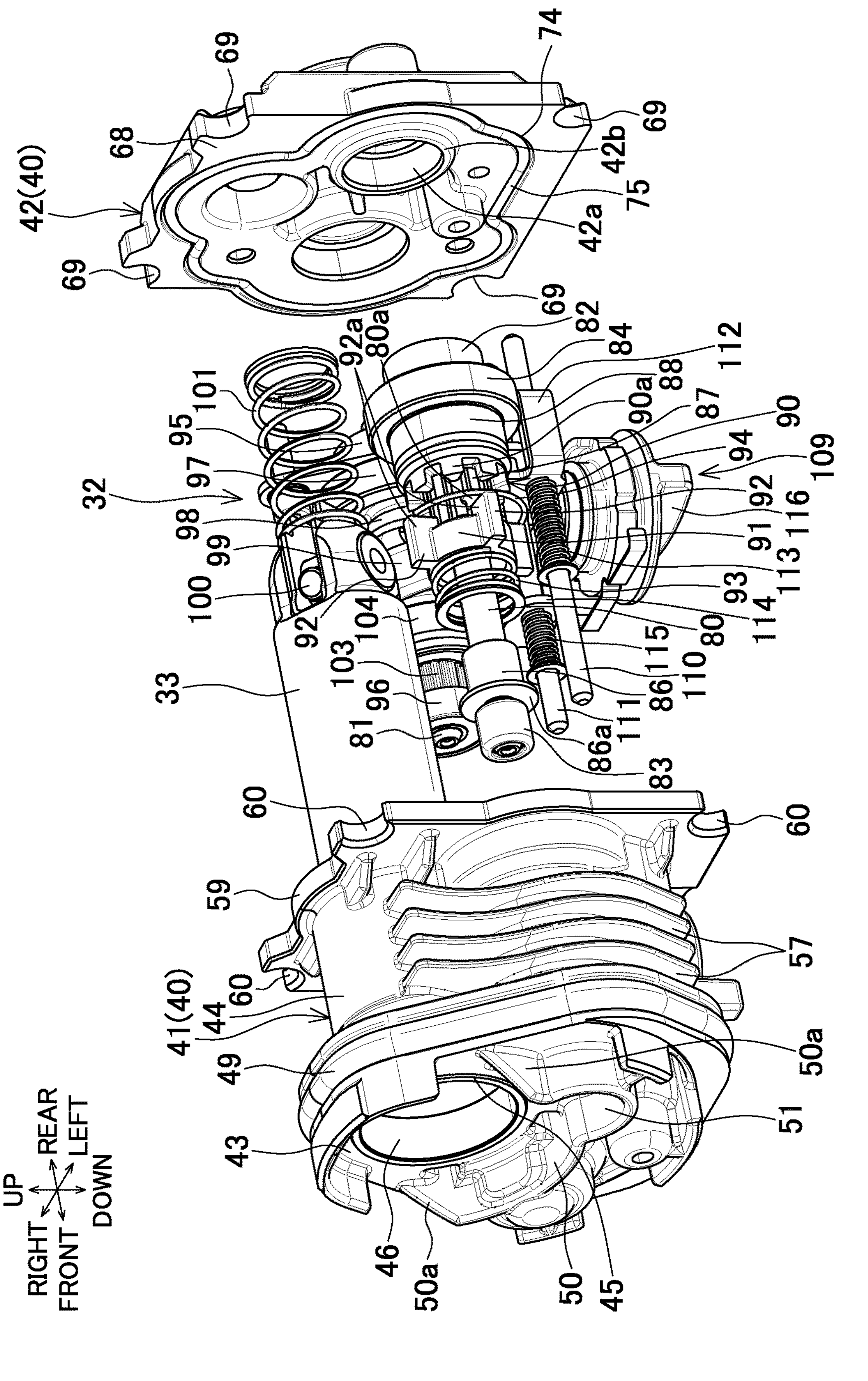
FIG. 6 is an exploded perspective view of the inner housing.

As illustrated in FIG. 6, the front housing 41 includes a bearing holder 43 on the front side and a trunk portion 44 on the rear side.

The bearing holder 43 has a hexagonal shape in a front view, which is slightly smaller than the rear cylinder portion 22. As illustrated also in FIG. 7, the bearing holder 43 includes an upper through-hole 45 in the center of the right and left on the upper portion. The rear portion of the tool holder 23 is inserted into the upper through-hole 45. A bearing metal 46 supporting the rear portion of the tool holder 23 is held inside the upper through-hole 45. A lower through-hole 47 having a smaller diameter than that of the upper through-hole 45 is formed on the lower left side of the upper through-hole 45.

Outside in the radial direction of the bearing metal 46 and on the outer peripheral surface of the bearing holder 43, a depressed groove 48 is formed over the whole circumference. An O-ring 49 is held onto the depressed groove 48. The O-ring 49 is pressed against the inner peripheral surface of the rear cylinder portion 22 to seal between the rear cylinder portion 22 and the bearing holder 43. Accordingly, space between the outer housing 3 and the inner housing 40 is partitioned into a front and rear with the O-ring 49 as a boundary. On the front side of the O-ring 49, space between the tool holder 23 and the outer housing 3 is sealed at the front by the oil seal 25.

On the front face of the bearing holder 43, an inner-side rib 50 is formed facing forward. As illustrated also in FIG. 8, in a front view, the inner-side rib 50 is formed in an arc shape in the front view in an appearance of surrounding the lower half of the gear 38 of the tool holder 23 and projecting from the upper through-hole 45. The front end of the inner-side rib 50 overlaps the gear 38 in the radial direction. The left side of the inner-side rib 50 configures a semicircular shape portion 51 that surrounds the lower through-hole 47 from an outside. The front face of the bearing holder 43 surrounded by the O-ring 49 is partitioned into upper and lower parts by the inner-side rib 50. Both right and left ends of the inner-side rib 50 configure inclined portions **50*a*, 50*a* that retreat as heading upward. The front end of the intermediate portion of the inner-side rib 50 is positioned at the frontmost from the bearing holder 43**.

Figure 9:
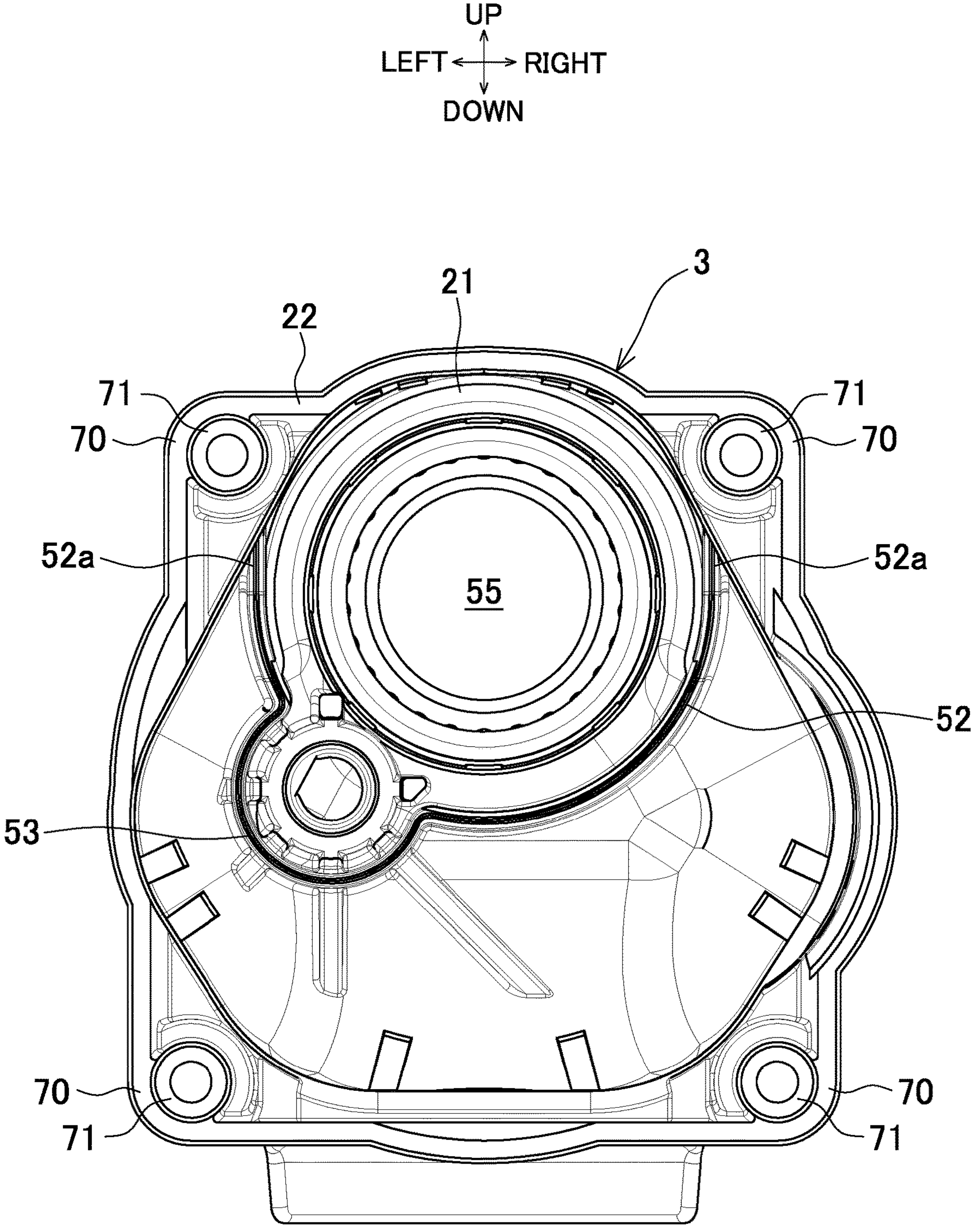
FIG. 9 is an enlarged back view of the outer housing.

On the other hand, in the outer housing 3, on the inner surface on the front side of the rear cylinder portion 22, as illustrated in FIG. 9, an outer-side rib 52 opposed to the inner-side rib 50 of the bearing holder 43 and projecting rearward is formed. The outer-side rib 52 is a rib (what is called a crush rib) that projects to the lower side of the gear 38 in an assembled state of the inner housing 40 and is brought into close contact with the inner-side rib 50 by being pressed against the front end of the inner-side rib 50 to cause the rear end to be deformed. The outer-side rib 52 is formed so as to be mirror symmetrical to the inner-side rib 50 in the front and rear and includes a semicircular shape portion 53 opposed to the semicircular shape portion 51 on the left side. As illustrated in FIG. 4, the outer-side rib 52 includes upper end portions **52*a*, 52*a* on both right and left end sides projecting forward and abut on the front face of the bearing holder 43. The upper end portions 52*a*, 52*a* have rear edges being in an inclined shape going forward as heading downward and fit the inclined portions 50*a*, 50*a* on both right and left ends of the inner-side rib 50**.

Figure 10:
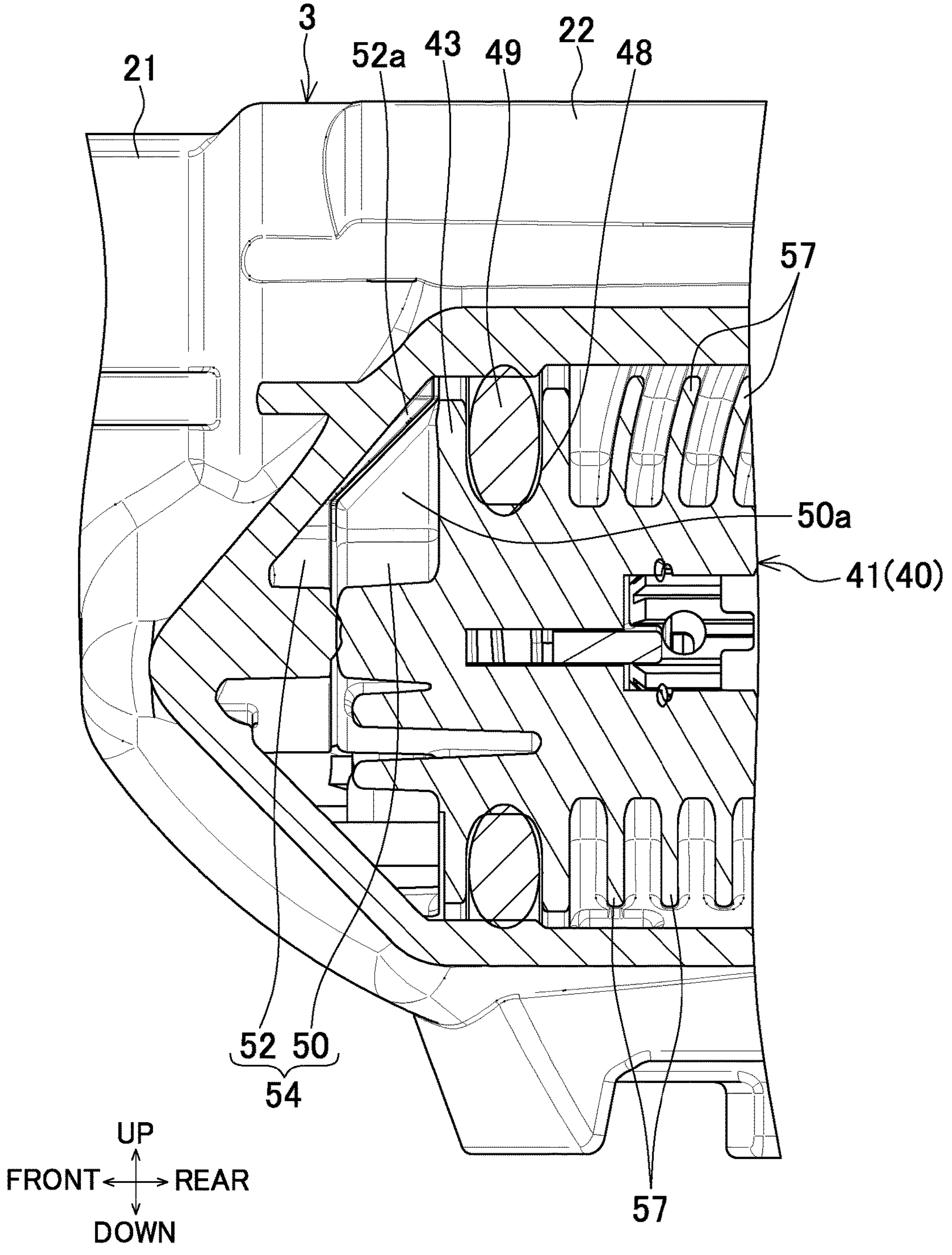
FIG. 10 is a cross-sectional view (with the outer housing) taken along line F-F in FIG. 8.

Accordingly, in a state where the inner housing 40 is assembled to the outer housing 3, as illustrated in FIG. 10, a partition wall 54 is formed by butting the outer-side rib 52 and the inner-side rib 50 together. As a result, inside the outer housing 3, the front space of the O-ring 49 is divided into upper and lower parts by the partition wall 54. The upper side of the partition wall 54 configures a front-side grease chamber 55 defined between the oil seal 25 and the O-ring 49. The front-side grease chamber 55 is communicated with a rear-side grease chamber 56 inside the inner housing 40 via the lower through-hole 47 and the like. The front-side grease chamber 55 and the rear-side grease chamber 56 configure a driving mechanism housing region (hereinafter abbreviated as a "housing region") T.

Figure 11:
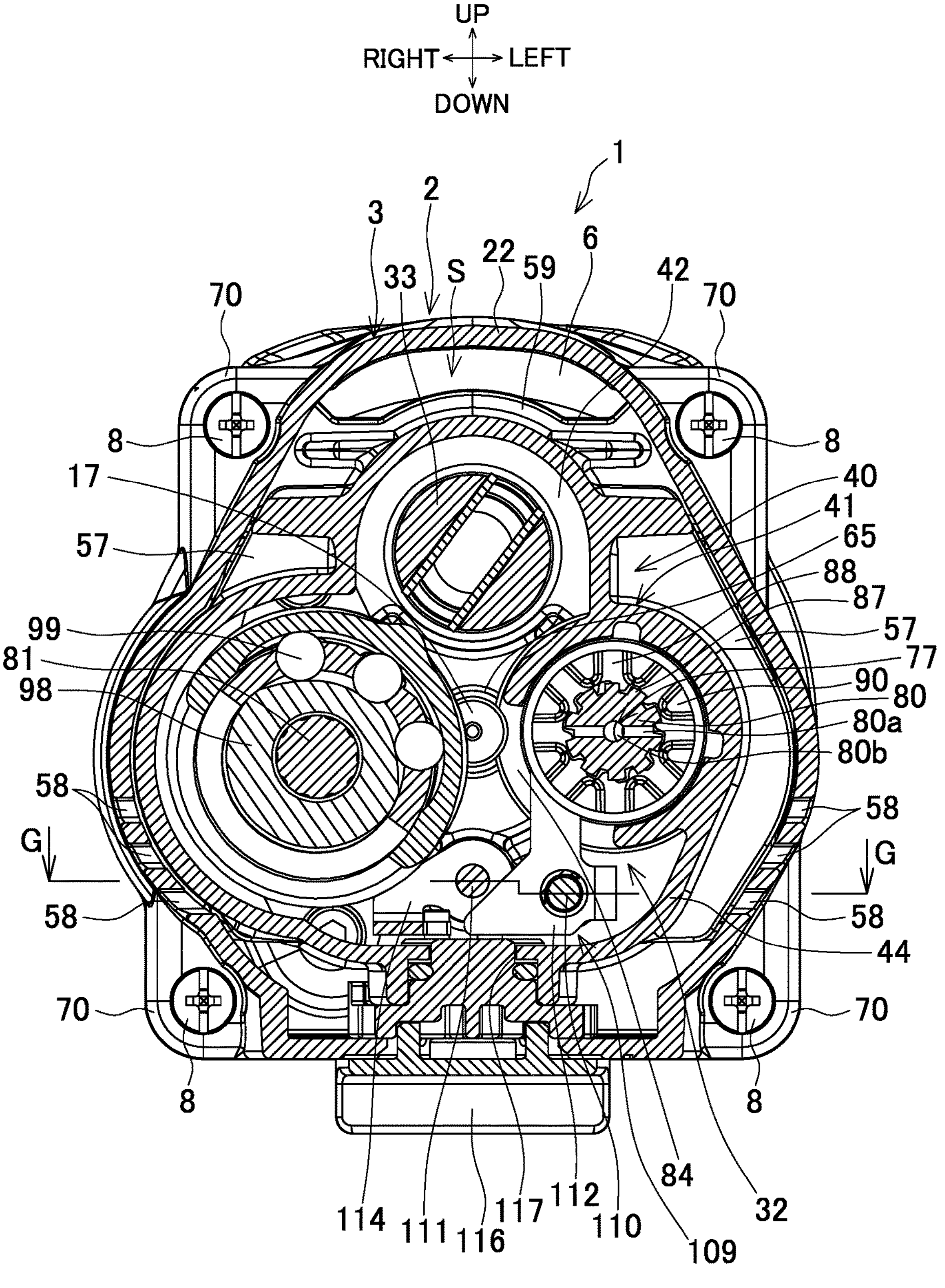
FIG. 11 is a cross-sectional view taken along line C-C in FIG. 3.

The trunk portion 44 has a tubular shape with a hexagonal shape in a front view, which is slightly smaller than the bearing holder 43. A plurality of heat radiating fins 57, 57 . . . are each disposed upright on the right and left side surfaces of the trunk portion 44. Each of the heat radiating fins 57 is formed so as to extend in an up-down direction and disposed upright at predetermined intervals in the front-rear direction. As illustrated in FIG. 11, each of the heat radiating fins 57 has an outside end edge that comes close to the inner surface of the rear cylinder portion 22. A plurality of front exhaust outlets 58, 58 . . . extending in the front-rear direction are each formed outside of the heat radiating fins 57 in a projection direction and on the right and left side surfaces of the rear cylinder portion 22. The right and left front exhaust outlets 58 are arranged to be opposed sandwiching an axis line direction of the output shaft 10 in a plan view.

On the rear end of the trunk portion 44, a front flange 59 having a square shape in a front view is formed. Four semicircular cutouts 60, 60 . . . are formed at the respective four corners of the front flange 59.

As illustrated in FIG. 3 and FIG. 11, the rear housing 42 has a rear through-hole 65 approximately in the center. The output shaft 10 passes through the rear through-hole 65. A bearing 66 supporting the output shaft 10 is held onto the rear portion of the rear through-hole 65. An oil seal 67 is disposed on the front side of the bearing 66.

On the front end of the rear housing 42, a rear flange 68 having a square shape in a front view, which is identical to the front flange 59 of the trunk portion 44, is formed. Four semicircular cutouts 69, 69 . . . are formed also at the respective four corners of the rear flange 68.

Figure 7:
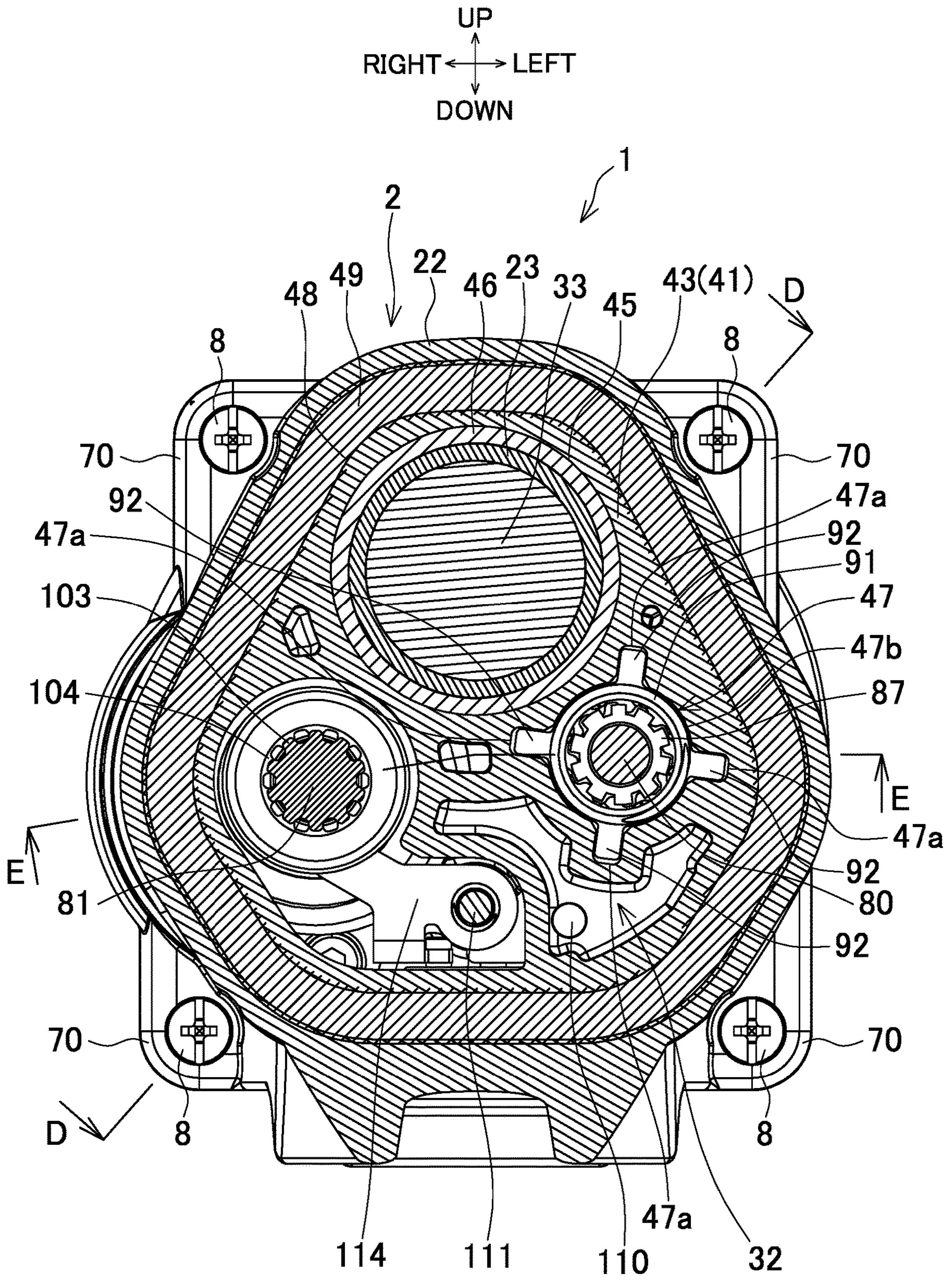
FIG. 7 is a cross-sectional view taken along line B-B in FIG. 3.

The front flange 59 and the rear flange 68 are sandwiched between the rear cylinder portion 22 of the outer housing 3 and the connecting portion 6 of the motor housing 4 in an overlapped state in the front and rear. As illustrated in FIG. 5, FIG. 7, and FIG. 9, four screwing portions 70, 70 . . . projecting out to the four corners in a front view are formed on the rear end of the rear cylinder portion 22. A circular-shaped screw boss 71 projecting rearward is each formed on the rear face of each of the screwing portions 70.

Figure 8:
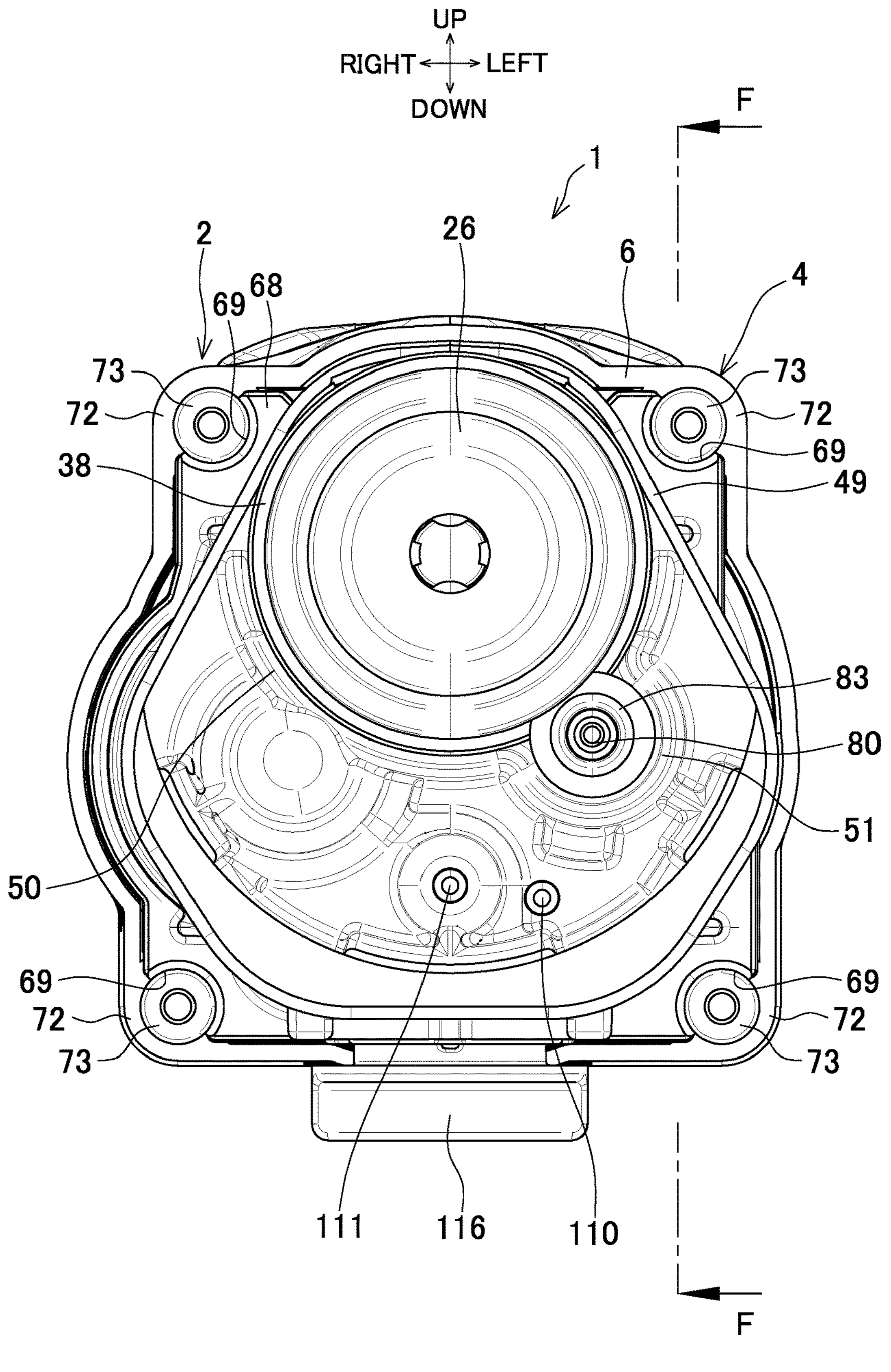
FIG. 8 is an enlarged front view of the inner housing and the motor housing from which the outer housing is omitted.
Figure 12:
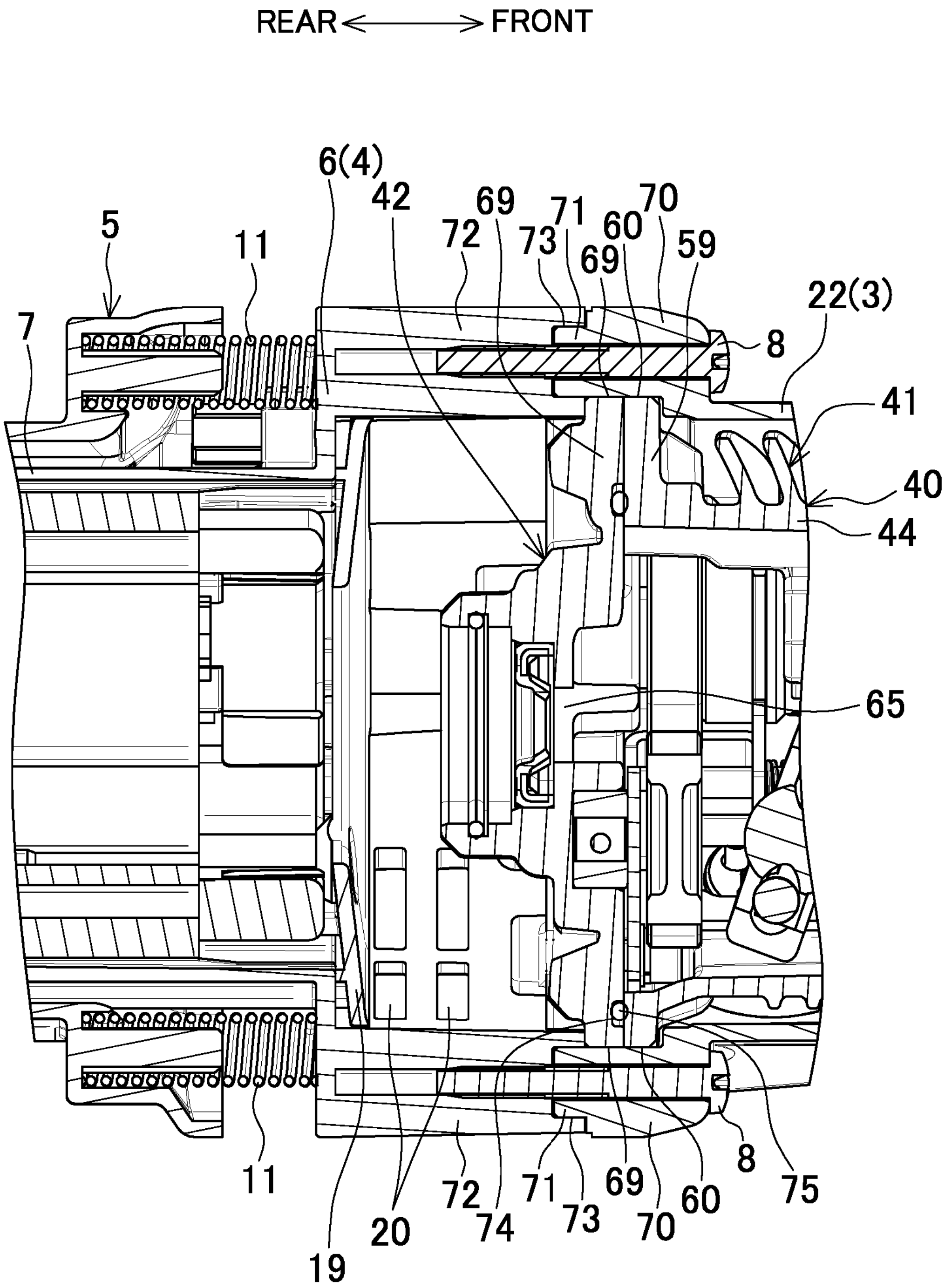
FIG. 12 is a cross-sectional view taken along line D-D in FIG. 7.
Figure 13:
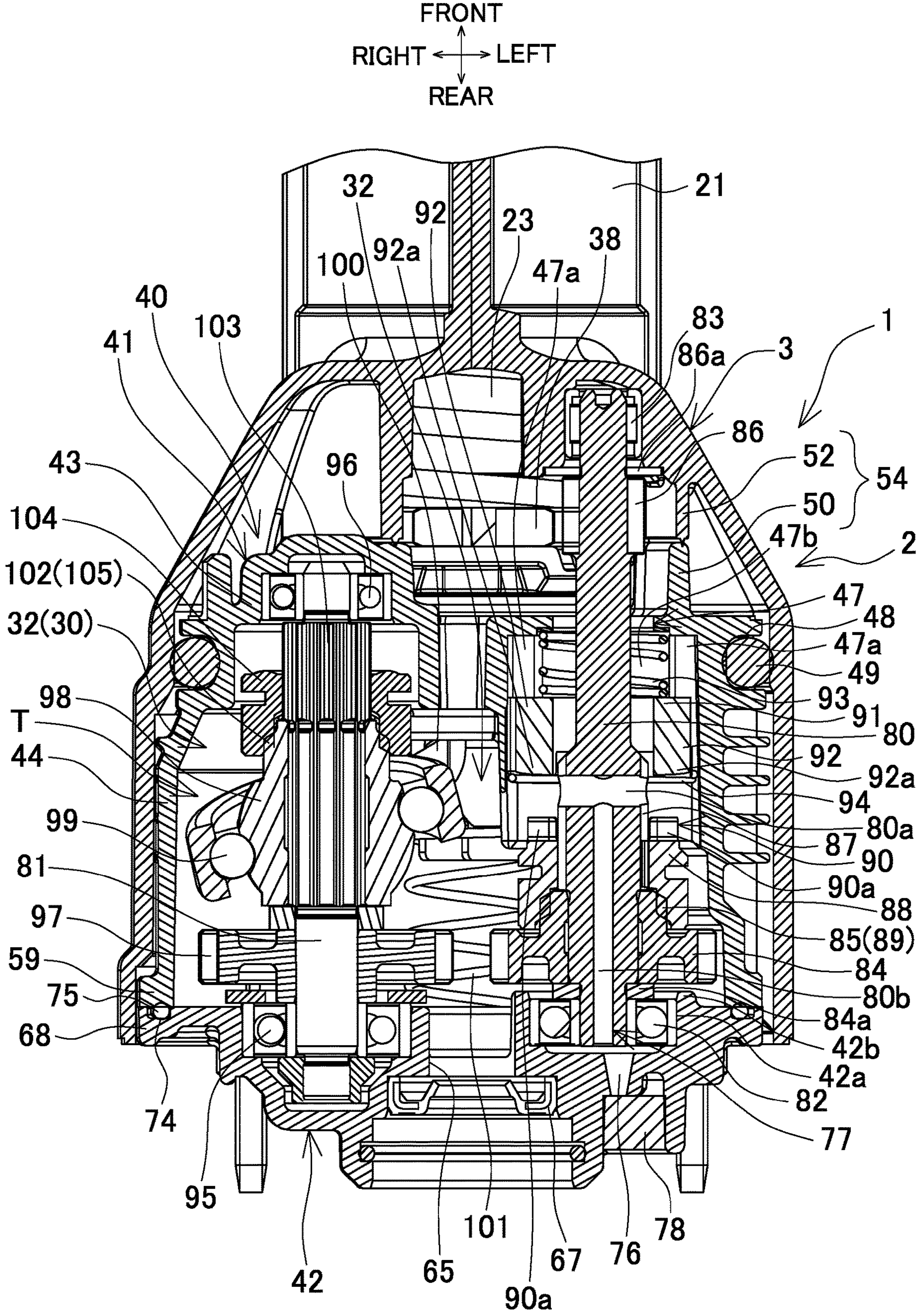
FIG. 13 is a cross-sectional view taken along line E-E in FIG. 7.

On the other hand, as illustrated in FIG. 5 and FIG. 8, corresponding to the respective screwing portions 70, four female threaded portions 72, 72 . . . having a female thread hole are formed at the respective four corners of the connecting portion 6. A circular depressed portion 73 to which the screw boss 71 is fitted is formed on the front face of each of the female threaded portions 72. Specifically, as illustrated in FIG. 12, an inlaying and connecting, in which each screw boss 71 is fitted to the circular depressed portion 73 in a state of screwing by the screw 8, is configured.

The front flange 59 and the rear flange 68 are sandwiched between the screwing portions 70 and the female threaded portions 72 in a state where the cutouts 60, 69 at the four corners are each engaged with the outer periphery of the screw boss 71 from the inside. In this state, the respective screwing portions 70 and the female threaded portions 72 are screwed by the screws 8, 8 . . . from the front. Then, connecting of the outer housing 3 to the motor housing 4 is made while the front flange 59 and the rear flange 68 are pressed from both front and rear faces and assembled. At this time, the rear end surfaces of the respective screwing portions 70 and the front end surfaces of the respective female threaded portions 72 are not in contact. Thus, the inner housing 40 is positioned at the rear portion of the outer housing 3.

In the positioning state, as illustrated in FIG. 3 and FIG. 11, a gap S is formed on the upper side between the rear cylinder portion 22 and the front and rear flanges 59, 68. Accordingly, the inside of the connecting portion 6 in which the fan 18 is housed is communicated with the gap S behind the O-ring 49. The gap S is communicated with space between the rear cylinder portion 22 and the front housing 41 and communicated with the front exhaust outlets 58 through between the heat radiating fins 57.

As illustrated in FIG. 6, a groove 74 is formed over the whole circumference on the front face of the rear flange 68 and at the abutting position with the front flange 59. An O-ring 75 is held inside the groove 74. The O-ring 75 abuts on the rear face of the front flange 59 in the assembling state of the inner housing 40 and seals between the front flange 59 and the rear flange 68.

A description of the rotation/hammering switching portion is provided below.

As illustrated in FIG. 6, FIG. 7, FIG. 11, and FIG. 13, the rotation/hammering switching portion 32 includes first and second intermediate shafts 80, 81 as two shafts on the right and left on the lower side of the tool holder 23. The first and second intermediate shafts 80, 81 are parallel to one another and arranged parallel to the tool holder 23.

Figure 14:
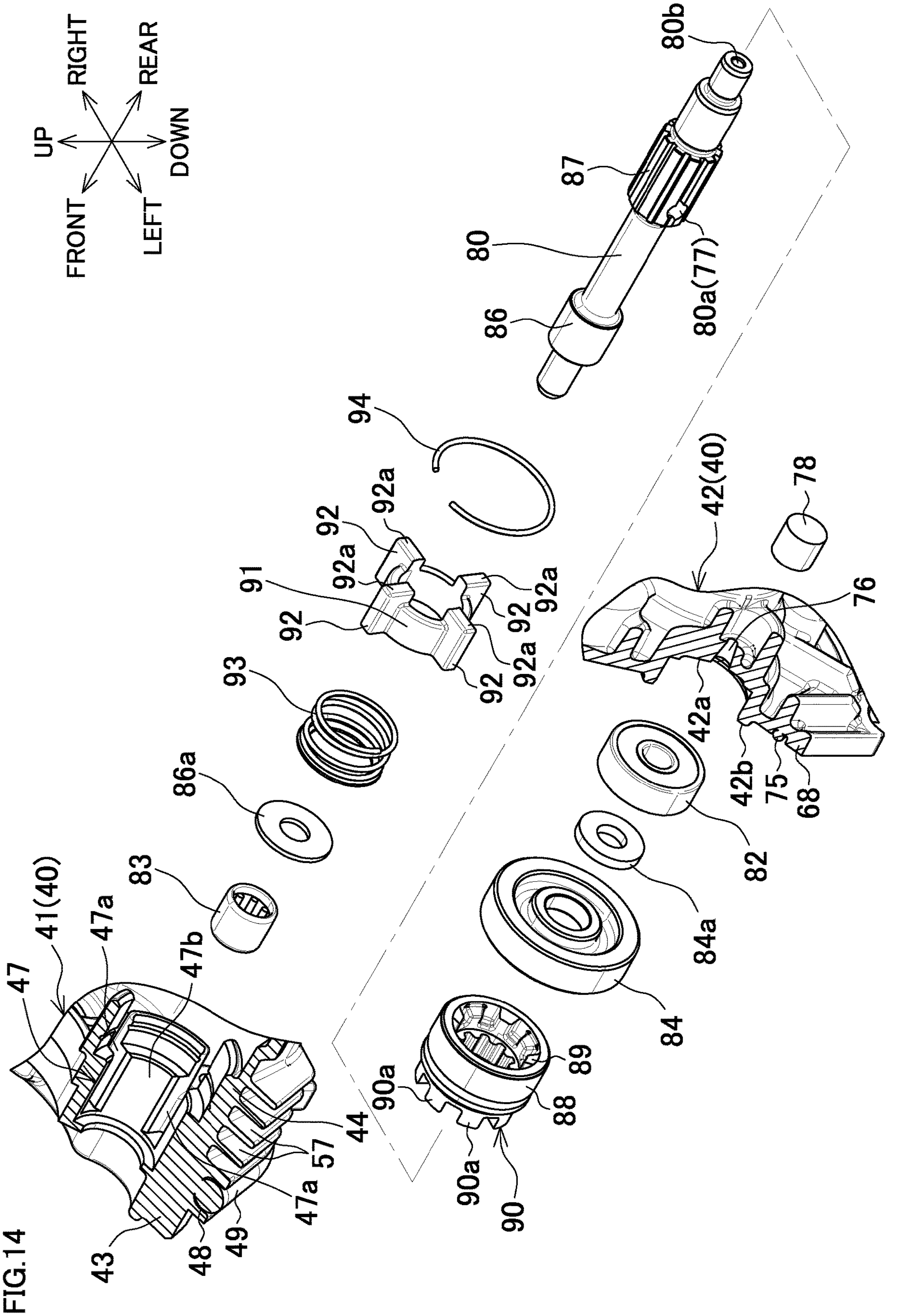
FIG. 14 is an exploded perspective view of a first intermediate shaft part.

As illustrated also in FIG. 14, the first intermediate shaft 80 on the left side has a rear end rotatably supported by the rear housing 42 via a bearing 82. The first intermediate shaft 80 has a front end passing through the lower through-hole 47 of the front housing 41 and extending forward. The front end of the first intermediate shaft 80 is rotatably supported by the front side inner surface of the rear cylinder portion 22 via a bearing 83. A first gear 84 that meshes with the pinion 17 of the output shaft 10 is externally mounted to be rotatable on the rear portion of the first intermediate shaft 80. A washer 84*a* is externally mounted between the bearing 82 and the first gear 84. A gear-side engaging portion 85 composed of a plurality of stops is formed on the front portion outer periphery of the first gear 84.

Ahead of the lower through-hole 47 and on the front portion of the first intermediate shaft 80, a second gear 86 is formed. The second gear 86 meshes with the gear 38 of the tool holder 23. A washer 86*a* is externally mounted between the second gear 86 and the bearing 83.

Ahead of the first gear 84 and on the first intermediate shaft 80, a first spline portion 87 is formed. A first clutch 88 is spline-connected to the first spline portion 87. The first clutch 88 is disposed to be integrally rotatable with the first intermediate shaft 80 and to be movable back and forth and includes a rear engaging portion 89 and a front engaging portion 90 composed of a plurality of stops. In the first clutch 88, the rear engaging portion 89 is engaged with the gear-side engaging portion 85 of the first gear 84 at a retreated position illustrated in FIG. 13. Accordingly, the rotation of the first gear 84 is transmitted to the first intermediate shaft 80 via the first clutch 88.

Ahead of the first clutch 88 and onto the lower through-hole 47 of the front housing 41, a lock ring 91 is held. The lock ring 91 has four rotation stopper pieces 92, 92 . . . arranged at equal intervals in a circumferential direction on the outer periphery. The rear end of each rotation stopper piece 92 is a stop 92*a* projecting rearward with respect to the rear end surface of the lock ring 91. Four grooves 47*a*, 47*a* . . . with which the four rotation stopper pieces 92 are engaged are formed on the inner surface of the lower through-hole 47. Accordingly, the lock ring 91 is held in a state where the rotation is restricted inside the lower through-hole 47. In this state, a tubular inner peripheral surface 47*b* of the lower through-hole 47 excluding the respective grooves 47*a* evenly holds the outer peripheral surface of the lock ring 91 around an axis line of the first intermediate shaft 80.

Inside the lower through-hole 47 and ahead of the lock ring 91, a coil spring 93 is housed. The lock ring 91 is biased rearward by the coil spring 93. A stop ring 94 with which the stops 92*a* are brought into contact is held at the rear of the lock ring 91. Accordingly, the lock ring 91 is biased to a retreated position of being brought into contact with the stop ring 94.

The front engaging portion 90 of the first clutch 88 includes eight stops 90*a*, 90*a* . . . that are more than the four stops 92*a* of the lock ring 91. The first clutch 88 is separated from the first gear 84 at an advance position, and the stops 90*a* of the front engaging portion 90 are engaged with the stops 92*a* of the lock ring 91 in a rotation direction. Accordingly, the rotation of the first gear 84 is not transmitted to the first intermediate shaft 80, and the rotation of the first intermediate shaft 80 is locked together with the first clutch 88.

Thus, when the rotation of the first intermediate shaft 80 is locked, the rotation of the tool holder 23 is locked via the gear 38 meshing with the second gear 86 of the first intermediate shaft 80.

However, the first clutch 88 is in a state of not being engaged with any of the first gear 84 and the lock ring 91 at an intermediate position between the advance position and the retreated position.

On the first intermediate shaft 80, a through-hole 80*a* is formed on the rear side of the lock ring 91 and in the first spline portion 87. The through-hole 80*a* has a circular shape in a lateral cross-sectional surface and is formed to pass through in a diametrical direction of the first spline portion 87. In the axial center of the first intermediate shaft 80, an axial center hole 80*b* is formed. The axial center hole 80*b* has a circular shape in a lateral cross-sectional surface having a smaller diameter than that of the through-hole 80*a* and has a front end communicated with the through-hole 80*a*. The axial center hole 80*b* has a rear end opened to the rear end surface of the first intermediate shaft 80.

The rear housing 42 has a front face on which a holding depressed portion 42*a* holding the bearing 82 is formed. A relief hole 76 is formed to pass through behind the holding depressed portion 42*a* and in the rear housing 42. The relief hole 76 has a tapered shape tapered off as heading rearward.

The relief hole 76 is communicated with the rear end of the axial center hole 80*b* via the bottom portion of the holding depressed portion 42*a*.

The bearing 82 is a bearing with a seal in which both front and rear faces in an axial direction are sealed. A ring-shaped peripheral wall portion 42*b* projecting forward beyond the bearing 82 is formed around the holding depressed portion 42*a*. The front end of the peripheral wall portion 42*b* comes close to the rear face of the first gear 84.

Thus, inside the inner housing 40, an air escape path 77 leading from the inlets on both ends of the through-hole 80*a* through the axial center hole 80*b* and the bottom portion of the holding depressed portion 42*a* to the outlet on the rear end of the relief hole 76 is formed. Accordingly, the inside of the inner housing 40 is communicated with the outside of the inner housing 40 via the air escape path 77. An absorber 78, such as a sponge, which blocks the rear end of the relief hole 76 is held onto the rear face of the rear housing 42.

The second intermediate shaft 81 on the right side has a rear end rotatably supported by the rear housing 42 via a bearing 95. The second intermediate shaft 81 has a front end rotatably supported by the bearing holder 43 of the front housing 41 via a bearing 96. A third gear 97 that meshes with the pinion 17 of the output shaft 10 is secured to the rear portion of the second intermediate shaft 81 to be integrally rotatable. A boss sleeve 98 is externally mounted to be rotatable in a separated body ahead of the third gear 97 and on the second intermediate shaft 81. A swash bearing 99 with an axis line inclined is disposed on the boss sleeve 98. The swash bearing 99 includes an outer race on which an arm 100 is disposed to project to an upward direction. The arm 100 has a distal end connected to the rear end of the piston cylinder 33. A coil spring 101 is interposed between the rear end of the piston cylinder 33 and the rear housing 42. The coil spring 101 biases the piston cylinder 33 to an advance position in a drill mode described later. A boss-side engaging portion 102 is formed on the front portion of the boss sleeve 98.

Ahead of the boss sleeve 98 and on the second intermediate shaft 81, a second spline portion 103 is formed. A second clutch 104 is spline-connected to the second spline portion 103. The second clutch 104 is disposed to be integrally rotatable with the second intermediate shaft 81 and to be movable back and forth and includes a clutch-side engaging portion 105 on the rear portion. In the second clutch 104, the clutch-side engaging portion 105 is engaged with the boss-side engaging portion 102 of the boss sleeve 98 at a retreated position. Accordingly, the rotation of the second intermediate shaft 81 is transmitted to the boss sleeve 98 via the second clutch 104. When the second clutch 104 advances, the clutch-side engaging portion 105 is separated from the boss-side engaging portion 102 and the rotation of the second intermediate shaft 81 is not transmitted to the boss sleeve 98.

Figure 15:
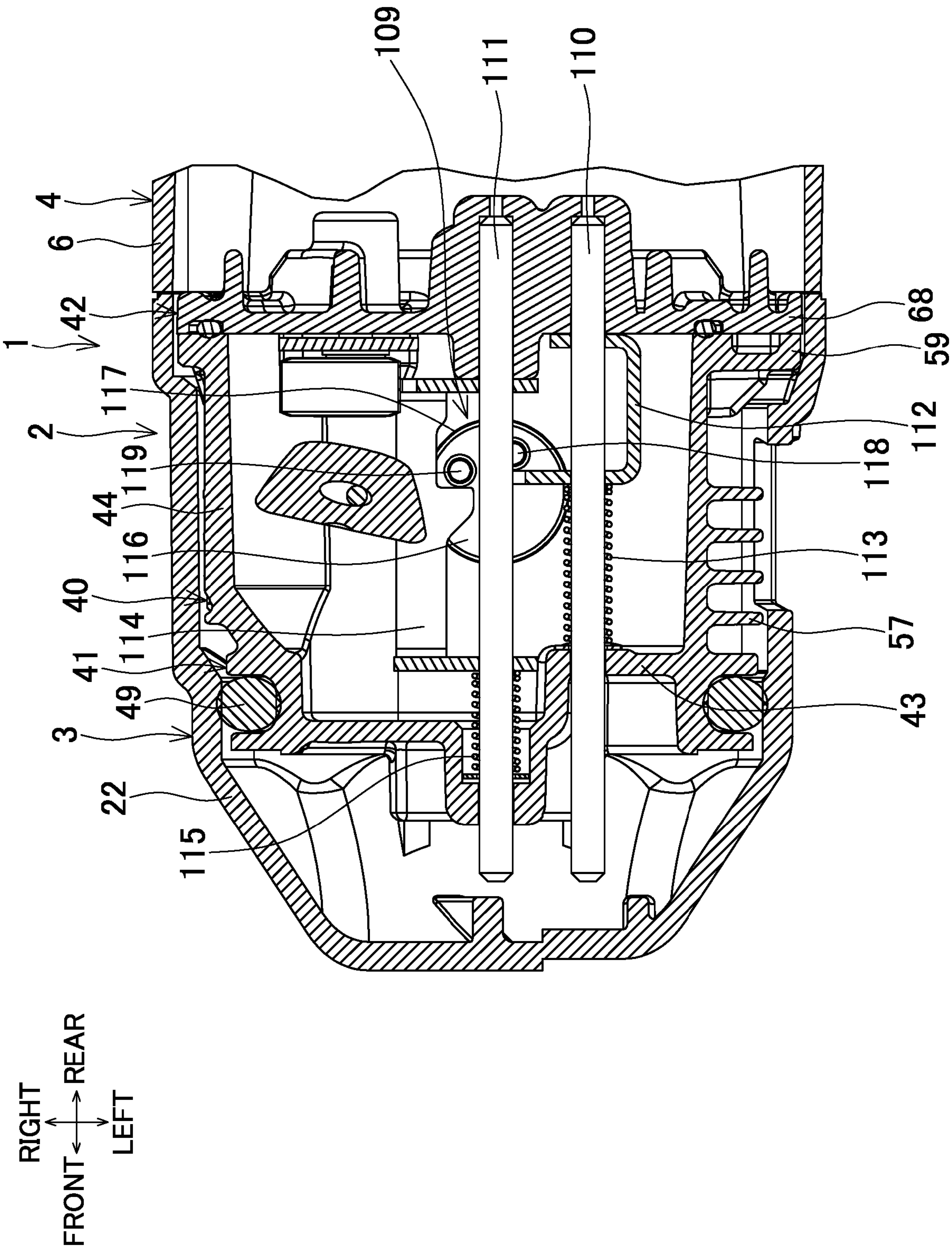
FIG. 15 is a cross-sectional view taken along line G-G in FIG. 11.

Below the first and second intermediate shafts 80, 81, a mode switch mechanism 109 is disposed. As illustrated also in FIG. 15, the mode switch mechanism 109 includes first and second rods 110, 111 as two rods on the right and left and the switching knob 116.

The first and second rods 110, 111 are parallel to one another and arranged parallel to the first and second intermediate shafts 80, 81.

The first rod 110 has a rear end supported by the rear housing 42 and a front end supported by the bearing holder 43 of the front housing 41. The first rod 110 includes a first plate 112. The first plate 112 is a strip plate that includes an intermediate portion extending parallel to the first rod 110. Both front and rear ends of the first plate 112 are folded to the first rod 110 side and let the first rod 110 to pass through. Accordingly, the first plate 112 is movable back and forth along the first rod 110. The first plate 112 has a front end that is engaged with the outer periphery of the first clutch 88. A coil spring 113 is externally mounted ahead of the first plate 112 and on the first rod 110. The coil spring 113 biases the first plate 112 to a retreated position where the first plate 112 is brought into contact with the front face of the rear housing 42. The retreated position is the retreated position of the first clutch 88 that retreats together with the first plate 112.

The second rod 111 has a rear end supported by the rear housing 42 and a front end supported by the bearing holder 43 of the front housing 41. The second rod 111 includes a second plate 114. The second plate 114 is a strip plate that includes an intermediate portion extending parallel to the second rod 111. Both front and rear ends of the second plate 114 are folded to the second rod 111 side and let the second rod 111 to pass through. Accordingly, the second plate 114 is movable back and forth along the second rod 111. The second plate 114 has a front end that is engaged with the outer periphery of the second clutch 104. A coil spring 115 is externally mounted ahead of the second plate 114 and on the second rod 111. The coil spring 115 biases the second plate 114 to a retreated position where the second plate 114 is brought into contact with the rear housing 42. The retreated position is the retreated position of the second clutch 104 that retreats together with the second plate 114.

Figure 16:
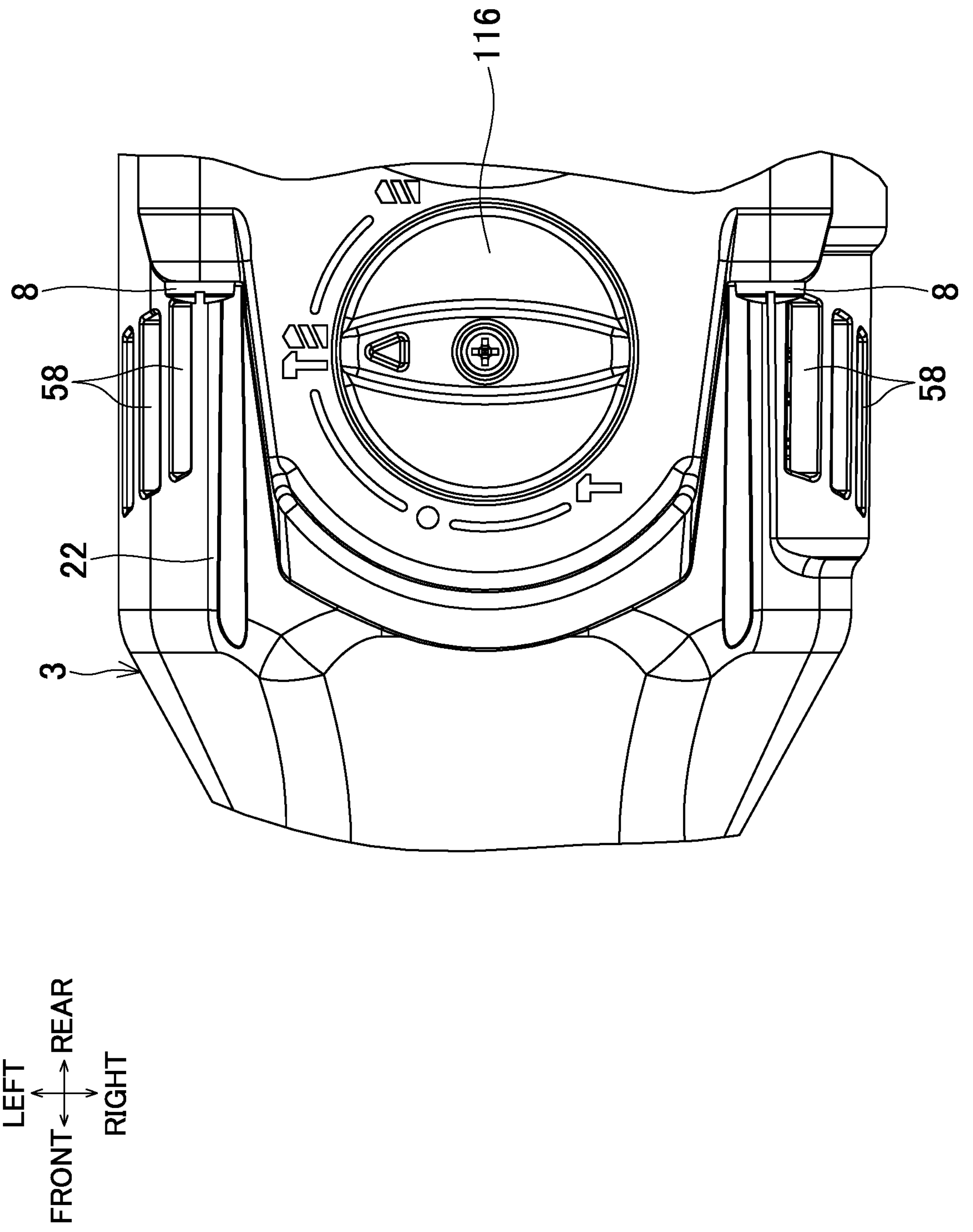
FIG. 16 is a partial bottom view of the outer housing.

Positions of the first and second plates 112, 114 are changeable by the switching knob 116. As illustrated in FIG. 16, the switching knob 116 is disposed to be rotationally operable to the lower surface of the rear cylinder portion 22. As illustrated in FIG. 3 and FIG. 11, the switching knob 116 projects into the inner housing 40 via a bottom through-hole 117 provided on the lower surface of the trunk portion 44 of the front housing 41. The switching knob 116 has a projecting end surface on which first and second eccentric pins 118, 119 are disposed. The first eccentric pin 118 is engaged with the front end of the first plate 112 from the rear, and the second eccentric pin 119 is engaged with the intermediate portion of the second plate 114 from the rear.

Accordingly, by the rotation operation of the switching knob 116, the front-rear positions of the first and second plates 112, 114 can be switched via the first and second eccentric pins 118, 119. That is, the operation mode can be switched between the drill mode, a hammer drill mode, a hammer mode (rotation lock), and a hammer mode (neutral).

A description of actuation of the hammer drill is provided below.

The switching knob 116 is switched to the drill mode. Then, the first eccentric pin 118 comes to the most retreated position, and the first clutch 88 comes to the retreated position together with the first plate 112. Accordingly, the rotation of the first gear 84 is put into a state of being transmitted to the first intermediate shaft 80 via the first clutch 88. The rotation of the first intermediate shaft 80 is put into a state of being transmitted from the second gear 86 to the tool holder 23 via the gear 38.

Meanwhile, the second eccentric pin 119 comes to the most advance position, and the second clutch 104 comes to the advance position together with the second plate 114. Accordingly, the rotation of the second intermediate shaft 81 transmitted from the output shaft 10 is put into a state of not being transmitted to the boss sleeve 98.

Therefore, turning the switch 13 ON by performing a push-in operation of the trigger 14 drives the motor 9 to cause the output shaft 10 to rotate. Then, the tool holder 23 rotates via the first intermediate shaft 80 to rotate the bit B on the distal end.

Next, the switching knob 116 is switched to the hammer drill mode. Then, the most retreated position of the first eccentric pin 118 is not changed, and the first plate 112 and the first clutch 88 remain in the retreated position.

Meanwhile, the second eccentric pin 119 retreats from the most advance position to the intermediate position, and the second clutch 104 comes to the retreated position together with the second plate 114. Accordingly, the rotation of the second intermediate shaft 81 is put into a state of being transmitted to the boss sleeve 98 via the second clutch 104.

Therefore, performing the push-in operation of the trigger 14 drives the motor 9, and the tool holder 23 rotates via the first intermediate shaft 80 to rotate the bit B on the distal end. Simultaneously, since the boss sleeve 98 rotates and the arm 100 swings back and forth, the piston cylinder 33 reciprocates. Accordingly, the striker 34 reciprocates and hammers the bit B via the impact bolt 35.

Next, the switching knob 116 is switched to the hammer mode (rotation lock). Then, the first eccentric pin 118 comes to the most advance position. The first clutch 88 comes to the advance position together with the first plate 112 to be engaged with the lock ring 91. Accordingly, the rotation of the first gear 84 is put into a state of not being transmitted to the first intermediate shaft 80, and the rotation of the tool holder 23 is locked together with the first intermediate shaft 80.

Meanwhile, the second eccentric pin 119 comes to the most retreated position, and the second clutch 104 remains in the retreated position. Accordingly, the rotation of the second intermediate shaft 81 is put into the state of being transmitted to the boss sleeve 98 via the second clutch 104.

Therefore, performing the push-in operation of the trigger 14 to drive the motor 9 causes the piston cylinder 33 to reciprocate in a state where the rotation of the tool holder 23 is locked and causes the bit B to be hammered by the striker 34 via the impact bolt 35.

When the first clutch 88 advances, the front faces of the stops 90*a* of the front engaging portion 90 are brought into contact with the rear faces of the stops 92*a* of the lock ring 91 and not engaged in the rotation direction in some cases. However, in this case, the lock ring 91 advances against the bias of the coil spring 93 and allows the first clutch 88 to advance.

Accordingly, when the first intermediate shaft 80 rotates by friction with the first gear 84 and the first clutch 88 rotates, the lock ring 91 retreats in a phase in which the stops 92*a* are engaged with the stops 90*a* to be engaged with the first clutch 88. As a result, the rotation of the first intermediate shaft 80 is locked.

Next, the switching knob 116 is switched to the hammer mode (neutral). Then, the first eccentric pin 118 retreats from the most advance position to the intermediate position. The first clutch 88 retreats together with the first plate 112 to be separated from the lock ring 91. However, the first clutch 88 comes to the intermediate position where the first clutch 88 is not engaged with the first gear 84. Accordingly, the rotation of the first gear 84 is put into a state of not being transmitted to the first intermediate shaft 80, and the tool holder 23 freely rotates together with the first intermediate shaft 80.

Meanwhile, the second eccentric pin 119 advances from the most retreated position to the intermediate position, and the second clutch 104 comes to the retreated position together with the second plate 114. Accordingly, the rotation of the second intermediate shaft 81 is transmitted to the boss sleeve 98 via the second clutch 104.

Therefore, performing the push-in operation of the trigger 14 to drive the motor 9 causes the piston cylinder 33 to reciprocate in a state where the tool holder 23 freely rotates and causes the bit B to be hammered by the striker 34 via the impact bolt 35.

When the hammer drill 1 is actuated in each operation mode, the fan 18 rotates by the rotation of the output shaft 10. Then, an outside air is suctioned from the air inlets 16 at the rear into the motor housing portion 7 of the motor housing 4 and moves forward to cool the motor 9. The cooling air flows into the connecting portion 6 and a part of the cooling air is discharged to the outside from the rear exhaust outlets 20. Another part of the cooling air moves forward inside the connecting portion 6 and passes through the gap S between the rear cylinder portion 22 and the front and rear flanges 59, 68 to flow into the rear cylinder portion 22. Then, the cooling air passes through outside space of the inner housing 40 and is discharged from the front exhaust outlets 58. At this time, the cooling air comes into contact with the front housing 41, thereby reducing a temperature rise of the front housing 41 due to heat generated by the driving mechanism 30. In particular, since the cooling air flows along the heat radiating fins 57, the heat in the front housing 41 is effectively radiated.

Meanwhile, the housing region T is filled with grease. In particular, since the front-side grease chamber 55 inside the front cylinder portion 21 is a narrow space where a useless space is eliminated by the partition wall 54, the filling rate of the grease inside the front-side grease chamber 55 increases. Accordingly, the grease scattered from the rotation/hammering actuation portion 31 becomes easy to reattach on the gear 38 and the like.

In some cases, air expands due to the heat generated by the driving mechanism 30 and the pressure inside the housing region T increases. Then, the air inside the rear-side grease chamber 56 enters the air escape path 77 from both ends of the through-hole 80*a* of the first intermediate shaft 80. The air is discharged to the outside of the inner housing 40 through the through-hole 80*a*, the axial center hole 80*b*, the bottom portion of the holding depressed portion 42*a*, and the relief hole 76. Accordingly, the pressure inside the rear-side grease chamber 56 is released.

At this time, since the through-hole 80*a* that is the inlet of the air escape path 77 is positioned on the peripheral surface of the first intermediate shaft 80, centrifugal force generated when the first intermediate shaft 80 rotates makes it difficult for the grease inside the rear-side grease chamber 56 to enter the through-hole 80*a*. In particular, since the through-hole 80*a* is formed in the first spline portion 87, the grease is splashed by the rotating spline teeth and the entry of the grease into the through-hole 80*a* is preferably avoided.

Further, the peripheral wall portion 42*b* is formed on the opening of the holding depressed portion 42*a*, thereby making it difficult for the grease to enter the holding depressed portion 42*a* along the front face of the rear housing 42. In particular, since the peripheral wall portion 42*b* is adjacent to the first gear 84, the grease is splashed by the rotating first gear 84 and the entry of the grease into a gap between the first gear 84 and the peripheral wall portion 42*b* is also preferably avoided. Even when the grease climbs over the peripheral wall portion 42*b*, the bearing 82 with a seal blocks the grease from flowing into the bottom portion of the holding depressed portion 42*a*.

An effect of the disclosure according to the air escape path is provided below.

The hammer drill 1 (one example of an impact tool) with the above-described configuration includes the housing 2 inside which the motor 9, the tubular tool holder 23, and the driving mechanism 30 are disposed. The tool holder 23 has the distal end on which the bit B is mountable. The driving mechanism 30 can hammer the bit B. The hammer drill 1 includes the first intermediate shaft 80 (one example of a rotation shaft) and the housing region T. The first intermediate shaft 80 is disposed in the driving mechanism 30 and rotates by the rotation of the output shaft 10 of the motor 9. The housing region T houses the driving mechanism 30 in a sealed state inside the housing 2. In the hammer drill 1, inside the first intermediate shaft 80, the air escape path 77 that releases the air inside the housing region T to the outside of the housing region T is formed while the through-hole 80*a* that is the inlet of the air escape path 77 is formed on the outer peripheral surface of the first intermediate shaft 80.

With this configuration, the centrifugal force of the first intermediate shaft 80 makes it difficult for the grease inside the rear-side grease chamber 56 to enter the air escape path 77. Accordingly, the pressure increased inside the housing region T due to the heat generation of the driving mechanism 30 can be effectively released.

The inlet of the air escape path 77 is formed at the through-hole 80*a* that passes through the first intermediate shaft 80 in an orthogonal manner. Accordingly, air can enter the air escape path 77 from both ends of the through-hole 80*a*, and even when one end is clogged by the grease, the entry of the air from the other end can be ensured.

Inside the housing region T, the bearing 82 that supports the first intermediate shaft 80 is disposed, and the outlet of the air escape path 77 is formed on the opposite side of the housing region T across the bearing 82 in the axis line direction of the first intermediate shaft 80. Accordingly, the air escape path 77 can be formed in a short distance in the axis line direction of the first intermediate shaft 80.

The bearing 82 is a bearing with a seal. Accordingly, a risk that the grease flows into the air escape path 77 via the bearing 82 is reduced.

The through-hole 80*a* is arranged at an intermediate portion in the axis line direction of the first intermediate shaft 80. Accordingly, it becomes further difficult for the grease inside the rear-side grease chamber 56 to enter the through-hole 80*a*.

In the first intermediate shaft 80, the first spline portion 87 (one example of a spline portion) to which the first clutch 88 (one example of a clutch) for switching the operation mode is slidably connected is formed, and the through-hole 80*a* is arranged in the first spline portion 87. Accordingly, the grease is splashed by the rotating spline teeth and the entry of the grease into the through-hole 80*a* is preferably avoided.

The housing region T is formed inside the inner housing 40 which is disposed inside the housing 2. The inner housing 40 includes the holding depressed portion 42*a* that holds the bearing 82. Around the holding depressed portion 42*a*, the ring-shaped peripheral wall portion 42*b* projecting to the housing region T side is formed. Accordingly, it becomes difficult for the grease to enter the holding depressed portion 42*a* along the inner surface of the inner housing 40.

On the first intermediate shaft 80, the first gear 84 (one example of a gear) adjacent to the peripheral wall portion 42*b* in the axis line direction is disposed. Accordingly, the grease is splashed by the rotating first gear 84 and the entry of the grease into the gap between the first gear 84 and the peripheral wall portion 42*b* can be also preferably avoided.

The driving mechanism 30 includes the rotation/hammering actuation portion 31 (one example of a rotation actuation portion) configured to rotate the tool holder 23, the first intermediate shaft 80 (one example of a rotation shaft) configured to transmit the rotation to the tool holder 23, and the second intermediate shaft 81 (one example of a rotation shaft) configured to hammer the bit B. The rotation shaft where the through-hole 80*a* is formed is the first intermediate shaft 80 configured to transmit the rotation. Accordingly, the air escape path 77 can be easily formed.

In the disclosure according to the air escape path, the following modifications can be made.

The position of the inlet of the air escape path is not limited to the intermediate portion of the intermediate shaft, such as the above-described configuration. As long as the inlet is on the outer peripheral surface of the rotation shaft, the inlet may be arranged near the front end or near the rear end. The inlet does not have to be provided at the spline portion.

The inlet does not have to be a through-hole. For example, the inlet may be formed at a closed-end hole that has one end opened to the peripheral surface of the rotation shaft and the other end remaining inside the rotation shaft. The through-hole and the closed-end hole do not have to be formed in a radial direction of the rotation shaft and may be formed so as to incline in the axis line direction of the rotation shaft.

The size and shape of the path cross-sectional area of the air escape path are not limited to the above-described configuration. The axial center hole can be configured to have a diameter identical to the through-hole or a larger diameter than that of the through-hole. The air escape path does not have to have a circular shape in a lateral cross-sectional surface.

The air escape path may be disposed in the intermediate shaft for hammering. In a case where one intermediate shaft is used, the air escape path may be disposed in the intermediate shaft. The air escape path is not limited to be disposed in the intermediate shaft for switching rotation/hammering and may be disposed in another intermediate shaft.

The disclosure is not limited to the application to a hammer drill. The disclosure can be applied to other impact tools, such as an electric hammer.

As an impact tool, the structure is not limited to the structure in which a piston cylinder is reciprocated by the intermediate shaft (one shaft may be acceptable) and a rotation conversion member. For example, an impact tool in which a crank mechanism is employed and the piston cylinder is reciprocated by a connecting rod may be applied.

An effect of the disclosure according to the lock ring of the tool holder is provided below.

The hammer drill 1 with the above-described configuration has, inside the housing 2, the motor 9, the tubular tool holder 23 rotatable with the bit B mounted on the distal end, and the driving mechanism 30 that allows the rotation actuation of the tool holder 23 and/or the hammering actuation of the bit B. The hammer drill 1 has the mode switch mechanism 109 that can at least switch the operation mode of the driving mechanism 30 between the hammer mode performing only the hammering actuation of the bit B and the hammer drill mode performing the rotation actuation of the tool holder 23 and the hammering actuation of the bit B. The driving mechanism 30 has the first intermediate shaft 80 (one example of a rotation transmission shaft) for transmitting the rotation of the output shaft 10 of the motor 9 to the tool holder 23. In the first intermediate shaft 80, the first clutch 88 (one example of a rotation transmission member) for transmitting the rotation to the tool holder 23 is disposed. On the axis line of the first intermediate shaft 80, the lock ring 91 (one example of a lock member) with which the first clutch 88 is engaged for restricting the rotation of the tool holder 23 is arranged. Meanwhile, around the axis line of the first intermediate shaft 80, the lock ring 91 is evenly held by the lower through-hole 47 which is disposed on the front housing 41 inside the housing 2.

With this configuration, the lock ring 91 is arranged on the axis line of the first intermediate shaft 80. Therefore, space is saved and downsizing of the housing 2 is achieved. Twist and inclination of the lock ring 91 are also difficult to occur even when a force in the rotation direction is applied from the tool holder 23 side during a rotation restriction. Accordingly, the rotation restriction of the tool holder 23 can be achieved in a space-saving manner and at low cost.

The lock ring 91 has a ring shape. Accordingly, the lock ring 91 can be arranged around the first intermediate shaft 80 in a space-saving manner. The twist and the inclination are also difficult to occur.

The rotation transmission member is the first clutch 88 (one example of a clutch) disposed in the first intermediate shaft 80 for switching the rotation transmission to the tool holder 23. Accordingly, the rotation restriction of the tool holder 23 using the first clutch 88 can be easily performed.

The first clutch 88 slides on the axis line of the first intermediate shaft 80 and is engaged and disengaged with the lock ring 91 in association with the switching operation by the mode switch mechanism 109. Accordingly, the first clutch 88 can be engaged and disengaged in a state of directly facing the lock ring 91 and the twist and the inclination are difficult to occur on the lock ring 91 when the rotation restriction is performed.

The lock ring 91 is disposed to be movable to the axis line direction of the first intermediate shaft 80 and biased to a position where the first clutch 88 can be engaged by the coil spring 93 (one example of an elastic member). Accordingly, even if the lock ring 91 fails to be engaged with the first clutch 88 and collides with the first clutch 88, the lock ring 91 can move to the axis line direction to release the impact, and once the engagement with the first clutch 88 becomes possible, the lock ring 91 returns to the original position to ensure engaging. In particular, since the coil spring 93 is arranged on the same axis line as the lock ring 91, the movement of the lock ring 91 becomes smooth.

The lock ring 91 has the rotation stopper pieces 92 (one example of a rotation stopper portion) that are engaged with the grooves 47*a* of the lower through-hole 47 in the front housing 41, and the rotation stopper pieces 92 double as an engaged portion of the first clutch 88. Accordingly, the shape of the lock ring 91 becomes a rational configuration without becoming complicated.

The lower through-hole 47 (one example of a holding portion of the lock ring 91) in the front housing 41 has the inner peripheral surface 47*b* (one example of a circumferential surface) slidingly in contact with the outer surface of the lock ring 91 around the axis line of the first intermediate shaft 80. Accordingly, the lock ring 91 is evenly held and durability is increased. The movement of the lock ring 91 in the axis line direction is also smoothly guided.

The engaged portion of the first clutch 88 in the lock ring 91 and the front engaging portion 90 (one example of an engaging portion) to the lock ring 91 in the first clutch 88 are each formed by the mutually different numbers of the stops 90*a* and the stops 92*a*. Accordingly, the first clutch 88 becomes easy to be engaged with the lock ring 91.

The driving mechanism 30 has the first and second intermediate shafts 80, 81 parallel to the tool holder 23, and the first intermediate shaft 80 is the rotation transmission shaft and the second intermediate shaft 81 is for the hammering actuation of the bit B. Accordingly, the lock ring 91 can be easily arranged on the axis line of the first intermediate shaft 80.

In the disclosure according to the lock ring of the tool holder, the following changes can be made.

The number of the stops of the lock ring can be increased and decreased. The shape of the stop can be changed. The stop does not have to double as the rotation stopper portion of the lock ring.

The rotation transmission member that is engaged and disengaged with the lock ring is not limited to a clutch. For example, the rotation transmission member may be set to be a gear that is disposed on the rotation shaft and meshes with the tool holder, and the gear may be slid to be engaged and disengaged with the lock ring.

The lock ring does not have to be disposed to be slidable in the axis line direction.

The lock member is not limited to a ring-shaped lock member with the above-described configuration. The shape can be changed, for example, by configuring a cross shape in which two plates intersect, or the like.

In the hammer drill, the selectable operation modes are not limited to four modes. As long as the hammer mode and the hammer drill mode can be at least selected, the disclosure is applicable. The structures of the mode switch mechanism and the switching knob can be also changed appropriately.

The following describes modification examples in common between the respective disclosures.

The direction of the motor is not limited to the front-rear direction and can be changed appropriately.

The motor is not limited to a motor with a brush, and a brushless motor can be employed.

The power supply may be a battery pack instead of a commercial power supply.

The hammering actuation may be performed with the structure in which a piston, not a piston cylinder, reciprocates inside a secured cylinder. The structure in which an impact bolt does not exist and a striker directly hammers the bit may be applied.

From the contents of the above-described configuration, the following other disclosures are extracted.

(Other Disclosure 1)

A hammer drill has, inside a housing, a motor, a tubular tool holder rotatable with a bit mounted on a distal end of the tool holder, a driving mechanism that allows a rotation actuation of the tool holder and/or a hammering actuation of the bit, and a mode switch mechanism that can at least switch an operation mode of the driving mechanism between a hammer mode performing only a hammering actuation of the bit and a hammer drill mode performing a rotation actuation of the tool holder and the hammering actuation of the bit.

The driving mechanism has a rotation transmission shaft for transmitting a rotation of an output shaft of the motor to the tool holder, and in the rotation transmission shaft, a rotation transmission member which transmits a rotation to the tool holder is disposed.

On an axis line of the rotation transmission shaft, a lock member with which the rotation transmission member is engaged for restricting a rotation of the tool holder is arranged while the lock member is evenly held around an axis line of the rotation transmission shaft inside the housing.

(Other Disclosure 2)

In the hammer drill according to the other disclosure 1, the lock member has a ring shape.

(Other Disclosure 3)

In the hammer drill according to the other disclosure 1 or 2, the rotation transmission member is a clutch disposed in the rotation transmission shaft for switching a rotation transmission to the tool holder.

(Other Disclosure 4)

In the hammer drill according to the other disclosure 3, the clutch slides on an axis line of the rotation transmission shaft and is engaged and disengaged with the lock member in association with a switching operation by the mode switch mechanism.

(Other Disclosure 5)

In the hammer drill according to any one of the other disclosures 1 to 4, the lock member is disposed to be movable to an axis line direction of the rotation transmission shaft and biased to a position where the rotation transmission member can be engaged by an elastic member.

(Other Disclosure 6)

In the hammer drill according to any one of the other disclosures 1 to 5, the lock member has a rotation stopper portion that is engaged inside the housing, and the rotation stopper portion doubles as an engaged portion of the rotation transmission member.

(Other Disclosure 7)

In the hammer drill according to any one of the other disclosures 1 to 6, a holding portion of the lock member in the housing has a circumferential surface slidingly in contact with an outer surface of the lock member around an axis line of the rotation transmission shaft.

(Other Disclosure 8)

In the hammer drill according to any one of the other disclosures 1 to 7, an engaged portion of the rotation transmission member and an engaging portion which engages to the lock member are each formed by mutually different numbers of stops. The engaged portion is disposed in the lock member and the engaging portion is disposed in the rotation transmission member.

(Other Disclosure 9)

In the hammer drill according to any one of the other disclosures 1 to 8, the driving mechanism has two rotation shafts parallel to the tool holder, and one of the rotation shafts is the rotation transmission shaft and the other of the rotation shafts is for a hammering actuation of the bit.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An impact tool comprising:

a housing; and a motor, a tubular tool holder, a driving mechanism including a rotation shaft, and a driving mechanism housing region inside the housing, wherein the tool holder has a distal end on which a bit is mountable, the driving mechanism is configured to hammer the bit, the motor and the driving mechanism are configured such that the rotation shaft rotates by a rotation of an output shaft of the motor, the driving mechanism housing region houses the driving mechanism in a sealed state inside the housing, the driving mechanism and the driving mechanism housing region are configured to have an air escape path that (i) releases air inside the driving mechanism housing region to outside of the driving mechanism housing region, (ii) includes an axially-extending center hole of the rotation shaft and (iii) has an inlet in an outer peripheral surface of the rotation shaft, and the inlet is a through-hole that passes through an entirety of the rotation shaft, orthogonal to the axially-extending center hole.

2. The impact tool according to claim 1, wherein the through-hole has a circular shape in a lateral cross-sectional surface.

3. The impact tool according to claim 1, further comprising:

a bearing that (i) supports the rotation shaft and (ii) is inside the driving mechanism housing region, wherein the axially-extending center hole overlaps, radially, an entirety of the bearing.

4. The impact tool according to claim 3, wherein an outlet of the air escape path is blocked by a grease absorber having air permeability.

5. The impact tool according to claim 3, wherein the bearing is a bearing with a seal.

6. The impact tool according to claim 3, wherein the driving mechanism housing region is inside an inner housing which is inside the housing, the inner housing including a holding depressed portion that holds the bearing, and a ring-shaped peripheral wall portion projecting to the driving mechanism housing region is around the holding depressed portion.

7. The impact tool according to claim 6, further comprising:

a gear (i) adjacent to the peripheral wall portion in the axial direction and (ii) on the rotation shaft.

8. The impact tool according to claim 6, wherein the axially-extending center hole communicates with the holding depressed portion, the inner housing includes a relief hole in communication with the holding depressed portion, and the relief hole includes an outlet of the air escape path.

9. The impact tool according to claim 8, wherein the relief hole has a tapered shape tapered toward the outlet.

10. The impact tool according to claim 8, wherein the axially-extending center hole has a smaller diameter than that of the inlet.

11. The impact tool according to claim 1, wherein the inlet is at an intermediate portion in an axial direction of the rotation shaft.

12. The impact tool according to claim 1, wherein the rotation shaft includes a spline portion to which a clutch for switching an operation mode is slidably connected, and the inlet is in the spline portion.

13. The impact tool according to claim 1, wherein the driving mechanism includes a rotation actuation portion configured to rotate the tool holder, and the rotation actuating portion includes the rotation shaft.

14. An impact tool comprising:

a housing; and a motor, a tubular tool holder, a clutch, a driving mechanism including a rotation shaft, and a driving mechanism housing region inside the housing, wherein the tool holder has a distal end on which a bit is mountable, the driving mechanism is configured to hammer the bit, the motor and the driving mechanism are configured such that the rotation shaft rotates by a rotation of an output shaft of the motor, the driving mechanism housing region houses the driving mechanism in a sealed state inside the housing, the driving mechanism and the driving mechanism housing region are configured to have an air escape path that (i) releases air inside the driving mechanism housing region to outside of the driving mechanism housing region, (ii) includes an axially-extending center hole of the rotation shaft and (iii) has an inlet in an outer peripheral surface of the rotation shaft, the rotation shaft includes a spline portion, the clutch is (i) configured to switch an operation mode of the impact tool and (ii) slidably connected to the spline portion, and the inlet is in the spline portion.

* * * * *